(12) United States Patent
Ihara et al.

(10) Patent No.: US 10,363,712 B2
(45) Date of Patent: Jul. 30, 2019

(54) METHOD OF MANUFACTURING POLARIZING PLASTIC LENS

(71) Applicant: EHS LENS PHILIPPINES, INC., General Trias, Cavite (PH)

(72) Inventors: Masaki Ihara, Nagano (JP); Hiroshi Shimizu, Nagano (JP); Yoshinobu Ito, Nagano (JP); Toshihiko Shimizu, Nagano (JP); Kenichi Tonouchi, Nagano (JP)

(73) Assignee: EHS LENS PHILIPPINES, INC., Cavite (PH)

( * ) Notice: Subject to any disclaimer, the term of this patent is extended or adjusted under 35 U.S.C. 154(b) by 0 days.

(21) Appl. No.: 14/442,254

(22) PCT Filed: Nov. 14, 2013

(86) PCT No.: PCT/JP2013/080839
§ 371 (c)(1),
(2) Date: May 12, 2015

(87) PCT Pub. No.: WO2014/077338
PCT Pub. Date: May 22, 2014

(65) Prior Publication Data
US 2016/0144582 A1 May 26, 2016

(30) Foreign Application Priority Data

Nov. 14, 2012 (JP) .................................. 2012-250033

(51) Int. Cl.
*B29D 11/00* (2006.01)
*B29C 39/10* (2006.01)
(Continued)

(52) U.S. Cl.
CPC ........ *B29D 11/00644* (2013.01); *B29C 39/10* (2013.01); *B29C 39/24* (2013.01);
(Continued)

(58) Field of Classification Search
CPC .......... B29C 2043/3222; B29C 71/009; B29C 2049/4679; B29C 2049/4682; B29C 2049/4676
(Continued)

(56) References Cited

U.S. PATENT DOCUMENTS 3,786,119 A * 1/1974 Ortlieb ............. B29D 11/00413
264/1.32
4,615,667 A * 10/1986 Roy .................... B29C 49/0073
264/526
(Continued)

FOREIGN PATENT DOCUMENTS

CN 1367077 A 9/2002
CN 101443181 A 5/2009
(Continued)

OTHER PUBLICATIONS

STIC search performed on Jan. 24, 2017.*
(Continued)

*Primary Examiner* — James R Greece
*Assistant Examiner* — Travis S Fissel
(74) *Attorney, Agent, or Firm* — Oliff PLC

(57) ABSTRACT

An aspect of the present invention relates to a method of manufacturing a polarizing plastic lens, which comprises a reversing step of reversing a convex surface shape into a concave surface shape by pressing a polarizing film that has been curved surface processed, a casting mold assembling step of assembling a casting mold having a cavity within which the reversed polarizing film is positioned with the reversed polarizing film, an upper mold, a lower mold, and a sealing member that maintains a spacing between the upper mold and the lower mold, and a polymerizing and curing step of casting a curable composition into the cavity, and polymerizing and curing the curable composition that
(Continued)

has been cast to provide a polarizing plastic lens within which a polarizing film is positioned.

17 Claims, 20 Drawing Sheets

(51) Int. Cl.
| | |
|---|---|
| *B29C 39/24* | (2006.01) |
| *G02C 7/12* | (2006.01) |
| *G02B 5/30* | (2006.01) |
| *G02B 1/04* | (2006.01) |
| *B29K 29/00* | (2006.01) |
| *B29K 105/00* | (2006.01) |

(52) U.S. Cl.
CPC ........ *B29D 11/00442* (2013.01); *G02B 1/041* (2013.01); *G02B 5/3033* (2013.01); *G02C 7/12* (2013.01); *B29K 2029/04* (2013.01); *B29K 2105/256* (2013.01); *B29K 2995/0034* (2013.01); *G02C 2202/16* (2013.01)

(58) Field of Classification Search
USPC .................. 264/1.32, 2.1, 2.2, 2.3, 2.4, 2.6; 351/159.56, 159.57, 159.67, 159.74; 156/214, 232, 244.12, 708
See application file for complete search history.

(56) References Cited

U.S. PATENT DOCUMENTS

| | | | | |
|---|---|---|---|---|
| 5,231,262 | A * | 7/1993 | Matsumura | B23K 26/02 219/121.67 |
| 5,751,481 | A * | 5/1998 | Dalzell | B29C 51/428 264/1.32 |
| 5,997,139 | A | 12/1999 | Yasuda | |
| 6,048,192 | A * | 4/2000 | McGlynn | B29C 49/60 425/536 |
| 9,017,820 | B2 * | 4/2015 | Tamura | C03C 27/10 156/60 |
| 2002/0018177 | A1 * | 2/2002 | Dillon | G02C 7/00 351/159.62 |
| 2002/0084023 | A1 * | 7/2002 | Yamamoto | B29D 11/0073 156/244.27 |
| 2004/0077130 | A1 * | 4/2004 | Ho | H01L 21/68707 438/126 |
| 2005/0167862 | A1 * | 8/2005 | Sano | B29C 33/72 264/1.1 |
| 2005/0212155 | A1 * | 9/2005 | Matsuzawa | B29D 11/00125 264/1.32 |
| 2006/0219347 | A1 | 10/2006 | Begon et al. | |
| 2009/0165932 | A1 * | 7/2009 | Biteau | B29C 63/16 156/163 |
| 2009/0213283 | A1 * | 8/2009 | Burlingame | G02C 7/101 349/14 |
| 2009/0289397 | A1 * | 11/2009 | Kleemeier | B29C 51/10 264/571 |
| 2010/0193112 | A1 * | 8/2010 | Bovet | B29C 63/0073 156/196 |
| 2012/0013979 | A1 | 1/2012 | Biteau | |

FOREIGN PATENT DOCUMENTS

| | | |
|---|---|---|
| CN | 101466528 A | 6/2009 |
| JP | S54-128356 A | 10/1979 |
| JP | S59-169820 A | 9/1984 |
| JP | 2000-171761 A | 6/2000 |
| JP | 2002-189199 A | 7/2002 |
| JP | 2004-001362 A | 1/2004 |
| JP | 2007168310 A | 7/2007 |
| JP | 2007-264008 A | 10/2007 |
| JP | 2008-536171 A | 9/2008 |
| JP | 2009-103773 A | 5/2009 |
| JP | 2009-527783 A | 7/2009 |
| JP | 2009-537861 A | 10/2009 |
| JP | 2010-085911 A | 4/2010 |
| JP | 2012-198389 A | 10/2012 |
| JP | 2012-198390 A | 10/2012 |
| WO | 2006/105995 A1 | 10/2006 |
| WO | 2007/133208 A1 | 11/2007 |

OTHER PUBLICATIONS

Jul. 21, 2015 Office Action issued in Japanese Patent Application No. 2014-547041.
Dec. 30, 2015 Office Action issued in Chinese Patent Application No. 201380045422.4.
Feb. 18, 2014 International Search Report issued in International Patent Application No. PCT/JP2013/080839.
Feb. 18, 2014 Written Opinion issued in International Patent Application No. PCT/JP2013/080839.
May 28, 2015 International Preliminary Report on Patentability issued in International Patent Application No. PCT/JP2013/080839.
Jul. 5, 2016 Office Action issued in Japanese Application No. 2014-547041.
Jul. 7, 2016 extended European Search Report issued in European Patent Application No. 13855426.6.
Jan. 13, 2017 Office Action issued in Mexican Application No. MX/a/2015/006012.
Jun. 7, 2017 Office Action issued in Mexican Patent Application No. MX/2017/021041.

* cited by examiner

Fig. 1
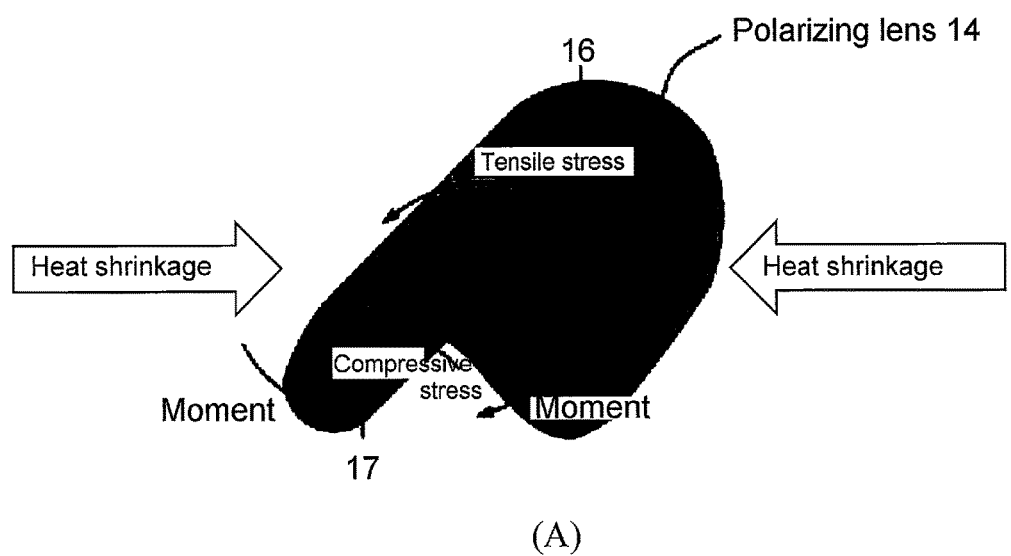
(A)
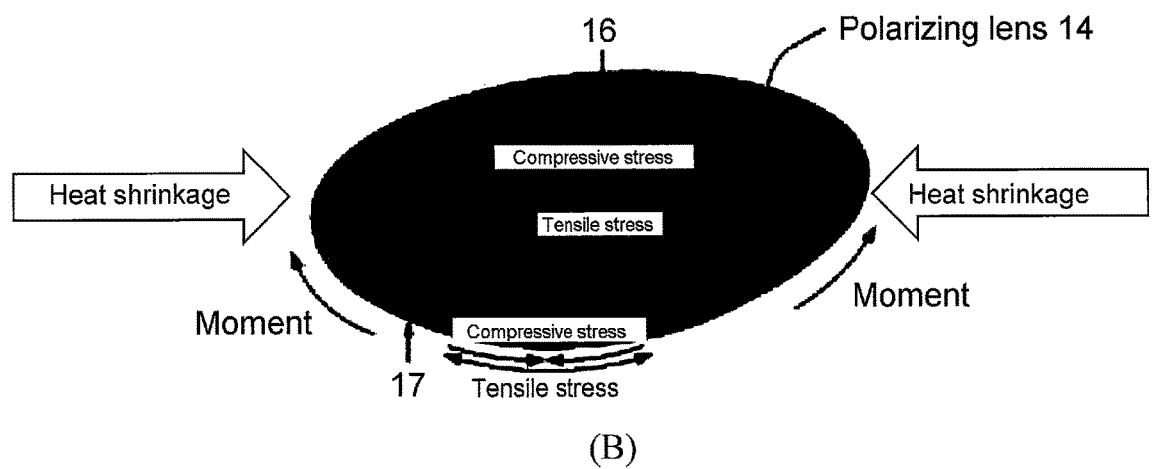
(B)

Fig. 14
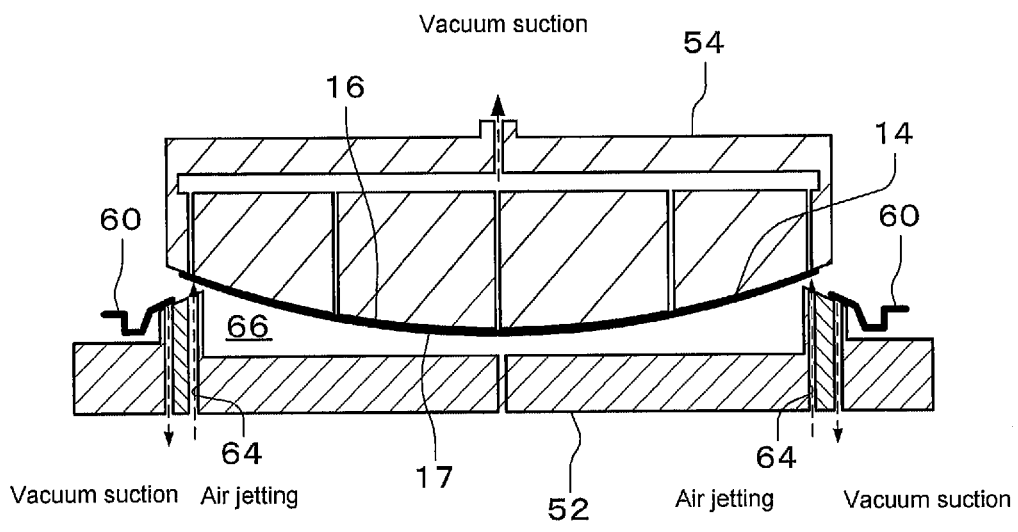
(A)
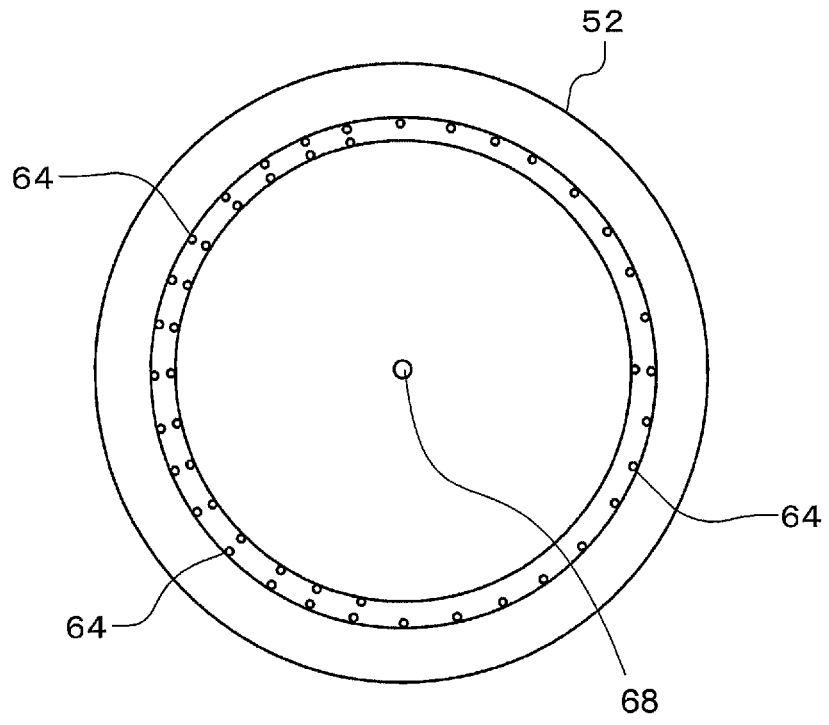
(B)

Fig. 24
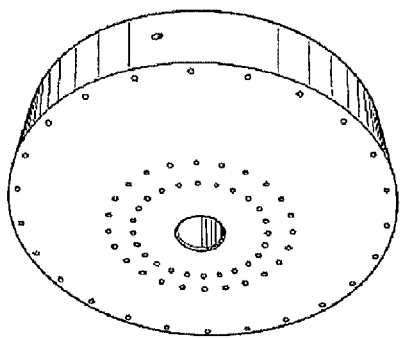
(A)
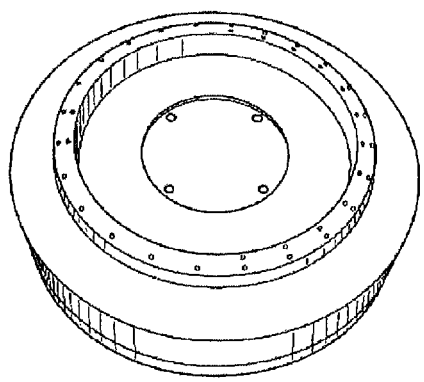
(B)
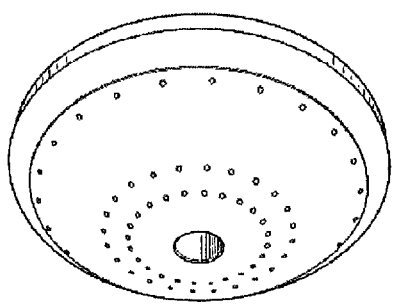
(C)
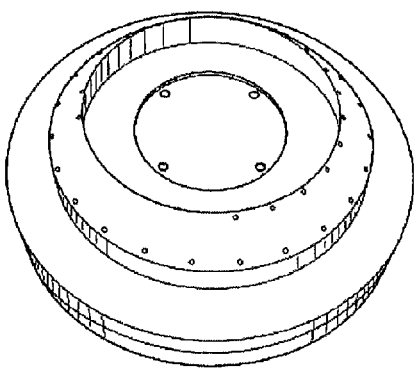
(D)

METHOD OF MANUFACTURING POLARIZING PLASTIC LENS

CROSS-REFERENCE TO RELATED APPLICATIONS

This application claims the benefit of priority to Japanese Patent Application No. 2012-250033 filed on Nov. 14, 2012, which is expressly incorporated herein by reference in its entirety.

TECHNICAL FIELD

The present invention relates to a method of manufacturing a polarizing plastic lens.

BACKGROUND ART

Polarizing lenses are often employed as lenses for non-prescription sunglasses (including fashion glasses) to protect the eyes because they function to block light. They are also employed as prescription eyeglass lenses.

The polarizing lenses described in Japanese Unexamined Patent Publication (KOKAI) Nos. 2009-103773 and 2012-198389 (which are expressly incorporated herein by reference in their entirety) are polarizing lenses with polarizing films embedded within them. They are manufactured by casting a curable composition around a polarizing film, heating, and curing (called the casting method or casting polymerization method).

SUMMARY OF THE INVENTION

Generally, polarizing films are imparted with polarization property by uniaxially stretching a plastic film, and thus have the property of tending to curl in the direction of stretching. In particular, since a polarizing film that has been curved (processed to impart a curved surface) by press molding so as to conform to the direction of the lens curve is used in the casting method, the tendency to curl is exacerbated and handling of the polarizing film becomes difficult. In this regard, Japanese Unexamined Patent Publication (KOKAI) No. 2009-103773 proposes preventing curling by forming a bend portion on the rim of the film. However, the bend portion is devised primarily in consideration of convenience during conveyance. Once the bend has been cut away, the polarizing film still tends to curl. When the polarizing film ends up curling in processing following cutting, handling of the polarizing film becomes difficult, productivity tends to drop, and the performance of the polarizing plastic lens that is manufactured and the quality of its external appearance tend to diminish. Thus, there is a need for a more efficient manufacturing method for plastic lenses that can inhibit curling of polarizing films.

An aspect of the present invention provides for a method of manufacturing a polarizing plastic lens with higher productivity by inhibiting curling of the polarizing film.

The present inventors conducted extensive research resulting in the first ever discovery that by reversing the concavity/convexity of a polarizing film that had been curved surface processed, the rigidity of the polarizing film increased. As a result, it became possible to inhibit curling of the polarizing film. The present invention was devised on this basis.

An aspect of the present invention relates to a method of manufacturing a polarizing plastic lens, which comprises:

a reversing step of reversing a convex surface shape into a concave surface shape by pressing a polarizing film that has been curved surface processed;

a casting mold assembling step of assembling a casting mold having a cavity within which the reversed polarizing film is positioned with the reversed polarizing film, an upper mold, a lower mold, and a sealing member that maintains a spacing between the upper mold and the lower mold; and a polymerizing and curing step of casting a curable composition into the cavity, and polymerizing and curing the curable composition that has been cast to provide a polarizing plastic lens within which a polarizing film is positioned.

The fact that curling of the polarizing film can be inhibited by the reversing step will be further described below.

FIG. 1 is a descriptive drawing showing stabilization of the shape of polarizing film 14 in an embodiment of the present invention. FIG. 1(A) shows the stress exerted on polarizing film 14 following molding (in a state where surface 16 is the convex surface). FIG. 1(B) shows the stress exerted on polarizing film 14 once it has been turned inside out. Polarizing film 14 relating to the present embodiment is rendered in a more stable shape by being turned inside out.

Polarizing film 14 shown in FIG. 1(A) is a film that has been deformed so as to impart a convex shape by curved surface processing. Surface 16 is convex and rear surface 17 is concave. No bend portion 60 (described further below) is provided.

The curved surface processing subjects polarizing film 14 to a bending moment in the direction of the arrows, thereby generating tensile stress and compressive stress in polarizing film 14. Normally, stress resisting the bending moment is generated within the material. Thus, there is a return to the original state once the bending moment has been removed. In a plastically deformed substance, the deformation state will be maintained. However, following curved surface processing, polarizing film 14 continues to curve even once the bending moment has been removed, and ends up curling into a cylinder shape. That is, full plastic deformation is not reached, the balance between tensile stress and compressive stress collapse, and the strength to resist the bending moment is thought to weaken. The reason why the balance might collapse in this fashion is presumed to be contraction of the film. For example, in the case of a polyvinyl alcohol (PVA) film that has been stretched to obtain a polarizing film, when stretched polarizing film 14 is heated, shrinkage takes place that tends to cause a return to the stable state prior to stretching. In the curved surface processing of polarizing film 14, polarizing film 14 is normally subjected to a heat treatment. Thus, a shrinkage phenomenon is similarly produced. The force of such shrinkage acts in the same direction as the compressive stress on the side of the rear surface (concave surface) 17 of polarizing film 14, which is presumed to greatly increase the force of bending polarizing film 14.

In this context, when polarizing film 14 is deformed (turned inside out) by being pressed to reverse the concave and convex surfaces, as shown in FIG. 1(B), the tensile stress and the compressive stress during molding as well as the force of heat shrinkage remain in polarizing film 14. However, the state becomes one in which a bending moment of the opposite direction from before acts forcibly on all of polarizing film 14. After having been turned completely inside out, a new tensile stress is generated on the side that has become the convex surface (the surface 17 side) of polarizing film 14, and a new compressive stress is generated on the concave surface. These stresses are such that they are canceled out by the compressive force and tensile force generated during molding. A balance is achieved, which is thought to stabilize the shape. Thus, for example, even when the bend portion of the polarizing film is cut, the polarizing film tends not to curl. As a result, compared to when the polarizing film has not been turned inside out, the shape of a polarizing film having a concave surface and a convex surface can be stabilized from when the polarizing film is placed in the casting mold to when the curable composition (also referred to as a "lens monomer") is polymerized and cured. Thus, it is possible to more efficiently manufacture polarizing plastic lenses.

In the definition of terms in the present invention and present specification, the terms "polarizing lens" and "polarizing plastic lens" are used to mean a lens of meniscus shape, regardless of whether possessing an optical design or prescription, within which is positioned (sandwiched) a polarizing film, and more particularly, a lens of meniscus shape comprising a polarizing film sandwiched between two lens substrates.

The term "eyeglass lens" is used to mean a finished lens (with both surfaces being final prescription surfaces) or a semifinished lens (with only one surface being a final prescription surface) having a meniscus shape, in the form of a lens with a lens shape that has been cut or is uncut.

The upper mold is a mold having a concave molding surface forming the convex surface of a lens of meniscus shape, while the lower mold is a mold having a convex molding surface forming the concave surface of the lens.

Normally, the outer diameter of an eyeglass lens will be 50 mm to 80 mm. The most widely used range is about 65 mm to 80 mm. In the case of an eyeglass lens, the outer diameter of the corresponding molds of the casting mold can be suitably designed.

The term "pressing" is used to include both pressing through contact with a member and noncontact pressing by blowing a gas or the like.

In an embodiment, the reversing step is conducted by at least one of convex surface center portion press processing in which a region containing a center portion of the convex surface of the polarizing film that has been curved surface processed is pressed and rear surface rim portion press processing in which a rim portion of a rear surface of the convex surface is pressed.

In an embodiment, the convex surface center portion press processing is conducted by pressing the region with a convex surface of a pressing member and the convex surface of the pressing member has an identical curvature to the polarizing film. In the present invention and present specification, the term "identical curvature" is not limited to the case of complete equality, but includes cases of curvature differing to a degree permitting the obtaining of a similar or identical effect. The term "curvature of a polarizing film" refers to the curvature of either the convex surface or the rear (concave surface), or to the average value of curvature of the two surfaces.

In an embodiment, the pressing member has an suctioning means, and the suctioning means suctions and holds the polarizing film that is being pressed. This can facilitate causing the polarizing film to conform to the convex surface of the pressing member, and can facilitate the reversing step.

In an embodiment, the rear surface rim portion press processing is conducted by blowing a gas onto the rim portion of the rear surface. Conducting pressing in a noncontact state by blowing a gas is advantageous in terms of tending not to scratch the polarizing film.

In an embodiment, the reversing step is conducted on a polarizing film that has been positioned on a polarizing film holding member. The polarizing film holding member has an outer circumference portion and a concave portion in a center portion surrounded by the outer circumference portion, and the rear surface rim portion of the polarizing film comes into contact with the outer circumference portion, and the center portion that is surrounded by the rear surface rim portion is positioned on the concave portion and is held in a state of noncontact with the film holding member.

In an embodiment, the film holding member has a curvature in a radial direction of the surface of the outer circumference portion that is identical to a curvature of the polarizing film. Positioning the polarizing film on a film holding member of such a shape makes it possible to press the polarizing film while it is being held stably, facilitating implementation of the reversing step.

In an embodiment, the gas is brown by jetting the gas through ventilation holes provided in the surface of the outer circumference portion. In another embodiment, prior to jetting the gas, suction is conducted through the ventilation holes to suction and hold the rear surface outer circumference portion of the polarizing film.

A further aspect of the present invention relates to:
a polarizing plastic lens provided by the above manufacturing method; and
a polarizing film provided by reversing a convex surface shape of a polarizing film that has been curved surface processed into a concave surface shape.

As described above based on FIG. 1, the rigidity of the polarizing film is increased by subjecting it to a reversing step following curved surface processing, thereby preventing curling and facilitating handling. Due to its high rigidity, the film tends not to crack and has enhanced shape retention. Accordingly, deformation of the film due to the casting pressure in the course of casting lens monomer into the cavity of the casting mold in which the polarizing film has been positioned and unintended contact with the molding surface of the mold can be inhibited. Inhibiting deformation of the polarizing film during polymerization and curing can improve the yield and contribute to providing a polarizing lens that affords high optical performance with little distortion. The tendency of the polarizing film not to come into contact with the molding surfaces of the mold can allow the polarizing film to be positioned near the molding surface of the mold for polymerization and curing. As set forth further below, this point is advantageous for fabricating thin polarizing lenses. The fact that the polarizing film is of high rigidity can facilitate the operation of holding the film when assembling the casting mold including the polarizing film and in the step of measuring the shape of the film, set forth further below. As set forth above, the polarizing film the concave and convex surfaces of which are reversed following curved surface processing can contribute to enhancing the productivity and quality of the polarizing lens in which the film has been embedded.

BRIEF DESCRIPTION OF THE DRAWINGS

FIG. 1 A drawing descriptive of stabilization of the shape of the polarizing film relating to the present implementation mode. (A) shows the stress acting on the polarizing film following molding (with the first surface being in a convex surface state) and (B) shows the stress acting on a polarizing film that has been turned inside out.

FIG. 14 (A) is a schematic sectional view of a pressing member relating to the present implementation mode approaching the film holding member and turning the polarizing film inside out. (B) is a schematic drawing showing an example of the film holding member.

FIG. 24 Perspective views of reversal member sets of different curvatures. FIG. 24(A) shows a low base curve pressing member. FIG. 24(B) shows a low base curve film holding member. FIG. 24(C) shows a high base curve pressing member. FIG. 24(D) shows a high base curve film holding member. (A) and (B) are employed as a single set, as are (C) and (D).

MODES FOR CARRYING OUT THE INVENTION

Figure 2:
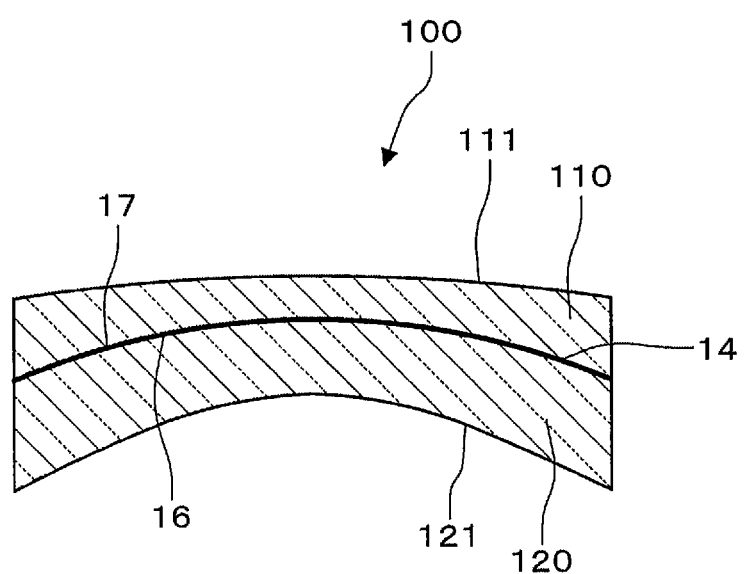
FIG. 2 A sectional view of a polarizing plastic lens relating to the present implementation mode.

The present invention will be described through specific implementation modes below with reference to the drawings. However, the present invention is not limited to the embodiments shown in the drawings. Portions described in the drawings have been shown suitably enlarged or reduced so as to be identifiable.

<Structure of Polarizing Plastic Lens>

The structure of the polarizing plastic lens will be described below with reference to the drawings.

FIG. 2 is a sectional view of a polarizing plastic lens relating to the present implementation mode. Polarizing plastic lens 100 relating to the present implementation mode is a semifinished eyeglass lens. As shown in FIG. 2, the structure includes a polarizing film 14 positioned between two lens substrates 110 and 120. In lens substrate 110, the surface on the opposite side from the surface opposing polarizing film 14 is a convex surface 111. In lens substrate 120, the surface on the opposite side from the surface opposing polarizing film 14 is a concave surface 121.

In this context, in polarizing plastic lens 100, polarizing film 14 desirably faces convex surface 111 and is convex in shape. Since polarizing film 14 can be positioned along the shape of convex surface 111 in this manner, the polishable thickness of lens substrate 120 can be increased relative to the case where polarizing film 14 is of a convex shape facing concave surface 121. Accordingly, the thickness of the lens obtained as a finished product can be reduced.

Lens substrates 110 and 120 are desirably plastic lenses with refractive indexes of equal to or higher than 1.60. The materials of lens substrates 110 and 120 are not specifically limited. Examples are acrylic resins, polyurethane resins, thiourethane resins, thioepoxy resins, methacrylic resins, allyl resins, episulfide resins, and polycarbonate resins. From the perspective of reducing thickness, thiourethane resins and thioepoxy resins are desirable. From the perspective of ease of coloration, urethane resins are desirable. Lens substrate 110 and lens substrate 120 are desirably comprised of the same material. Lens substrate 110 and lens substrate 120 can be dyed to impart color.

Polarizing film 14 is subjected to curved surface processing by pressing a flat sheet body with a known pressing means so that in the reversing step following implementation of curved surface processing, the convex surface formed by the curved surface processing will deform into a concave surface and the concave surface into a convex surface. Details regarding the curved surface processing and reversing step will be given further below. Polarizing film 14 is desirably either a single layer or a multilayer film equipped with a resin layer comprised of polyvinyl chloride (PVA). PVA is a good material in terms of transparence, heat resistance, affinity with dyes in the form of iodine or dichroic dyes, and orientation properties during stretching. For example, film 14 can be a film-like substrate obtained by press molding, vacuum molding, or the like a commercial iodine polarizing film to conduct curved surface processing to a specified curvature, and cutting into a round external shape.

A multilayer polarizing film 14 can be obtained by molding a film in which PVA is impregnated with iodine, to form a resin layer that has been uniaxially stretched, and then laminating a protective layer in the form of triacetylcellulose (TAC) on both surfaces of the resin layer. It is also possible to employ a polarizing film fabricated using a dichroic dye instead of iodine. It is also possible to employ a single layer polarizing film in the form of PVA on which a TAC protective film has not been laminated, or a polarizing film employing polyethylene terephthalate (PET) instead of PVA. In the present implementation mode, a polarizing film of PVA without lamination of protective layers of TAC is employed. Polarizing film 14 is colored to impart a predetermined color, such as brown or gray.

<Structure of Lens Monomer Infusion Machine>

An example of a lens monomer infusion machine that can be used to cast the curable composition (also referred to as a "lens monomer") into the cavity of the casting mold will be described next based on the drawings.

Figure 3:
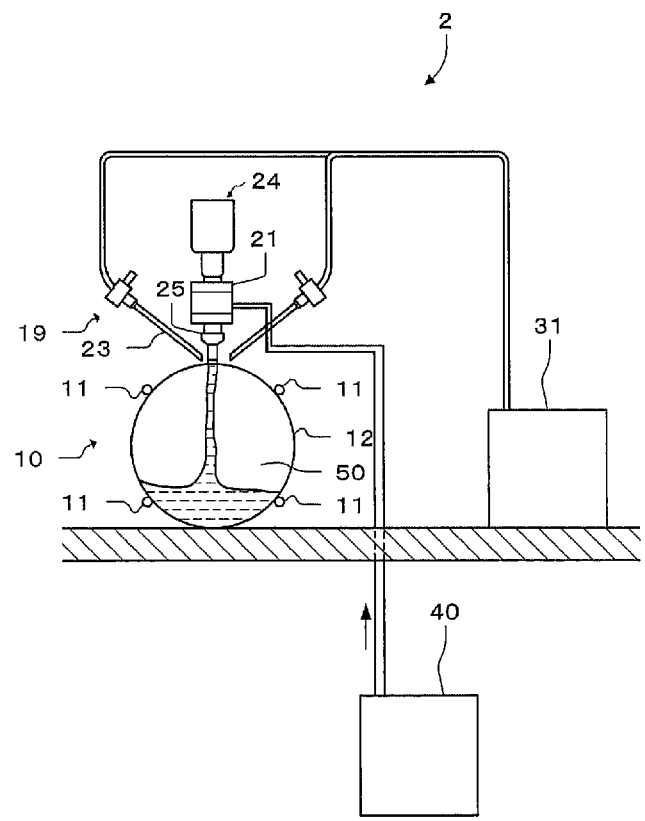
FIG. 3 A front view schematically showing a lens monomer infusion machine relating to the present implementation mode.
Figure 4:
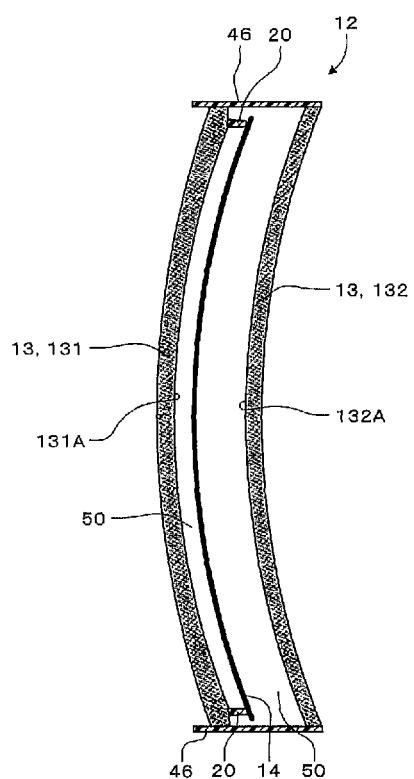
FIG. 4 A sectional view schematically showing a lens mold relating to the present implementation mode.

FIG. 3 is a front view schematically showing a lens monomer infusion machine 2 used to manufacture polarizing plastic lens 100 relating to the present implementation mode. FIG. 4 is a sectional view schematically showing the casting mold 12 used to mold polarizing plastic lens 100 relating to the present implementation mode.

Lens monomer infusion machine 2 relating to the present implementation mode is equipped with a positioning member 10, an suctioning member 19, and a feeding member 24, as shown in FIG. 3.

Multiple holding members 11 are positioned in positioning member 10. Holding members 11 hold casting mold 12.

As shown in FIG. 4, casting mold 12 comprises a pair of molds 13 made of glass, for example, that are positioned opposite each other (upper mold 131 and lower mold 132). The external shape of each of molds 13 is round, for example. A concave molding surface 131A that is used to form convex surface 111 of polarizing plastic lens 100 is formed in upper mold 131. A convex molding surface 132A that is used to form concave surface 121 of polarizing plastic lens 100 is formed in lower mold 132.

The type of material (inorganic, organic) of mold 13 is not specifically limited beyond that it be a material capable of withstanding heating in the manufacturing of polarizing plastic lens 100. In the present implementation mode, crown glass is employed in mold 13. Transparent organic substances (such as resins) deteriorate when irradiated with ultraviolet radiation, and are thus not suitable for use in a casting mold that molds large numbers of polarizing plastic lenses 100. However, for example, they can be used in casting molds for molding small numbers of sample product or the like by exploiting the cost advantage.

In the present implementation mode, polarizing film 14 is applied with an adhesive column 20 to upper mold 131.

In casting mold 12, without using a gasket, upper mold 131 and lower mold 132 are positioned with a prescribed gap between them such that molding surfaces 131A and 132A are facing each other, and adhesive tape 46 is wound over the entire circumference of the outer edges of upper and lower molds 131 and 132. In this manner, a cavity 50 enclosed by upper mold 131, lower mold 132, and adhesive tape 46 is formed.

In a portion of adhesive tape 46 is formed an casting hole, not shown, for casting lens monomer into cavity 50. This casting hole can be formed after casting mold 12 is held with pressing members 11 and mounted on positioning member 10, or can be formed by machining a hole in part of adhesive tape 45 during the forming of casting mold 12.

In FIG. 3, suctioning member 19 is positioned above positioning member 10. Suctioning member 19 is equipped with an suctioning tube 23 and a recovery member 31.

Suctioning tube 23 is shaped in the form of a tube and is positioned such that the tip of the tube is positioned near the casting hole. Suctioning tube 23 is connected to recovery member 31, suctions starting material composition that spills out of the casting hole of casting mold 12, and feeds it to recovery member 31.

Recovery member 31 recovers and stores the lens monomer that has been suctioned by suctioning tube 23. Further, recovery member 31 is equipped with a pump, not shown. Lens monomer is suctioned from suctioning tube 23 by suitably controlling this pump.

Feeding member 24 is equipped with a feeding member main body 21, a storage member 40, and a casting member 25.

Feeding member main body 21 is connected to storage member 40 and guides the lens monomer that enters from storage member 40 to casting member 25. A control element, not shown, is electrically connected to feeding member main body 21. The configuration can be such that the quantity of lens monomer that is fed into casting member 25 is adjusted by controls effected by this control element. Casting member 25 is equipped with a casting needle, not shown, that can be inserted into the casting hole provided in adhesive tape 46 of casting mold 12, and casts lens monomer that is fed by feeding member main body 21 into cavity 50 of casting mold 12.

Storage member 40 is connected to feeding member main body 21 and feeds lens monomer. A composition of a monomer of an isocyanate compound or an isothiocyanate compound having two or more isocyanate groups or isothiocyanate groups per molecule, and a monomer of a thiol compound having two or more mercapto groups per molecule, can be employed in the present implementation mode as the lens monomer fed from storage member 40. A composition containing a monomer of a thioepoxy compound can also be employed as the lens monomer. Intermediates of polymerization reactions, such as prepolymers, can be included in the lens monomer in addition to, or instead of, the monomers.

<Method of Manufacturing a Polarizing Plastic Lens>

The method of manufacturing polarizing plastic lens 100 of the present implementation mode will be described based on the drawings.

Figure 5:
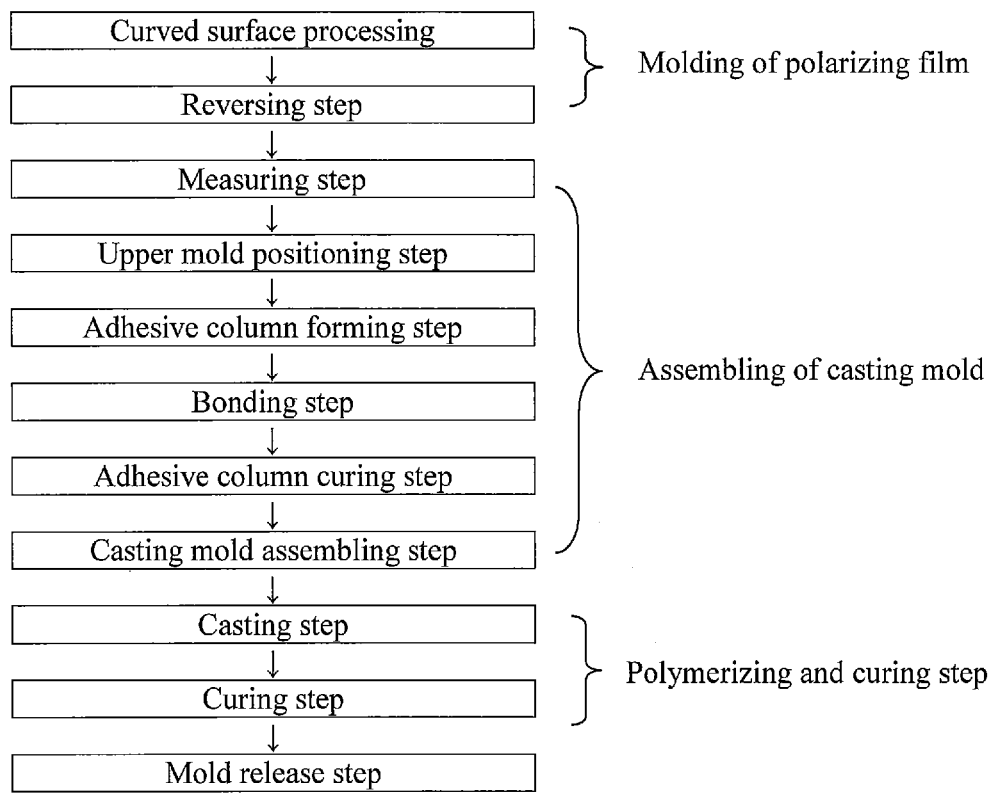
FIG. 5 A flowchart showing the process of manufacturing a polarizing plastic lens relating to the present implementation mode.

FIG. 5 is a flowchart showing the process of manufacturing polarizing plastic lens 100 relating to the present implementation mode. FIGS. 6 to 21 are schematic drawings showing the method of manufacturing polarizing plastic lens 100. The method of manufacturing polarizing plastic lens 100 will be described below with reference to FIGS. 5 to 21.

<Molding a Polarizing Film>

The molding of a polarizing film is conducted by curved surface processing and a reversing step.

Figure 6:
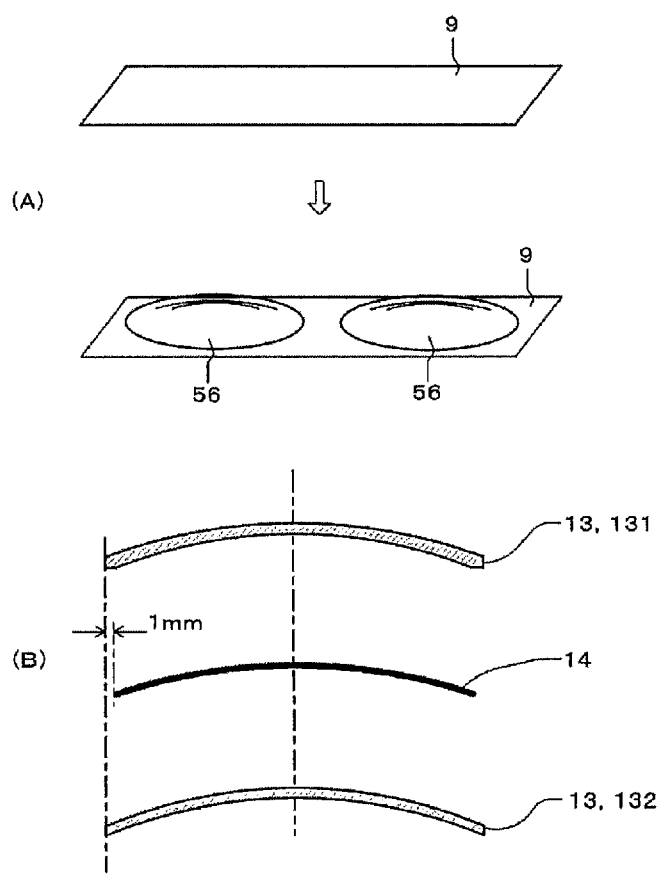
FIG. 6 A drawing showing curved surface processing of a polarizing film relating to the present implementation mode.
Figure 7:
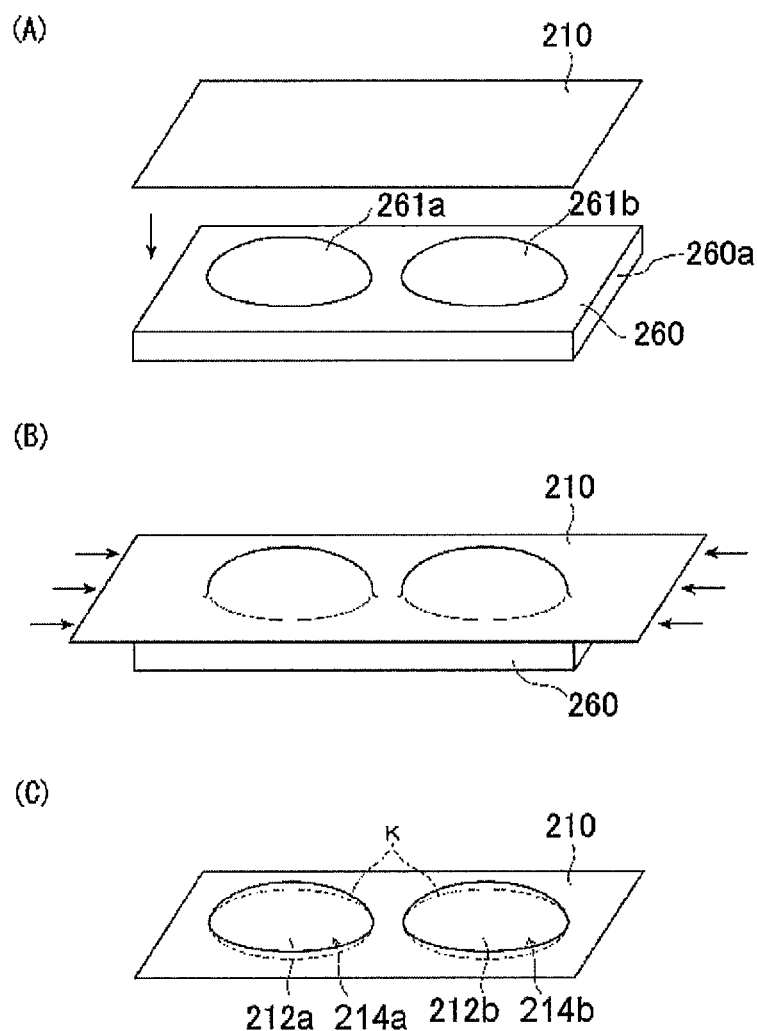
FIG. 7 A drawing descriptive of curved surface processing of the polarizing film.

FIG. 6 is a drawing showing the curved surface processing of polarizing film 14 relating to the present implementation mode. First, as shown in FIG. 6(A), a flat sheet body 9 that has been cut to a rectangular shape from a uniaxially stretched PVA film is pressed by a known pressing means to form two curved portions 56 (convex portions) (convex surface processing). The curvature of convex portions 56 is set based on the predetermined base curve (curvature of the convex surface 111 (see FIG. 2)) of the polarizing plastic lens 100 that is to be manufactured. Polarizing film 14 can be formed to have the same curvature as the base curve of polarizing plastic lens 100. In the present implementation mode, the size of the base curve is divided into multiple types and the curved portion 56 of the polarizing film is set to correspond to each division. It is also possible to obtain a polarizing film 14 in which curved portions 56 have already been formed and curved surface processing has already been concluded for use.

As shown in FIG. 6(B), the diameter of polarizing film 14 is desirably smaller than the inner diameter of upper mold 131 and lower mold 132. For example, the diameter of polarizing film 14 in the present implementation mode can be about 2 mm smaller than the inner diameter of upper mold 131. Thus, when introducing lens monomer into cavity 50, the lens monomer will move about in the gap between polymerizing film 14 and adhesive tape 46, facilitating the smooth casting of lens monomer into cavity 50.

The curved surface processing of the polarizing film that can be desirably conducted in the method of manufacturing a polarizing plastic lens relating to an embodiment of the present invention will be described next.

Of the two lens substrates that sandwich the polarizing film, one has a convex surface and the other has a concave surface. By positioning the polarizing film within the casting mold following curved surface processing, it is possible to embed the polarizing film between the two lens substrates along the curved surface shape of the lens. Curved surface processing is desirably conducted by the press molding method such that the polarizing film is made to correspond to the molding surface shape (concave surface shape) of the upper mold.

For example, a flat sheet of polarizing film is sandwiched and pressed in a press molding device having a shaping mold (master mold) with a pair consisting of a male mold and a female mold equipped with a temperature-adjusting means (heater, cooling medium, or the like) and a pressurizing means to conduct curved surface processing of the polarizing film into the shape of the surface of the shaping mold. Male and female molds with spherical molding surfaces are desirably employed. Because of the spherical surfaces and lack of complex shapes, a special pressing device is not required, a normal press molding device will suffice, and curving is facilitated.

FIG. 7(A) is a drawing showing the curved surface processing base of the male mold portion. Symbol 210 denotes a flat film member and symbol 260 denotes the curved surface processing base. Curved surface processing base 260 is comprised of a heat-resistant ceramic processing base part 260*a*, and a master mold part 261 of spherical glass mold (261*a*, 261*b*).

The curvature of the curved surface of master mold part 261 is set based on the base curve of the refractive surface on the convex surface side of the lens being manufactured.

A flat film member 210 that has been cut into rectangular shape out of a polarizing polyvinyl alcohol film is placed on the male mold of the master mold part and pressed, for example, at room temperature (about 20 to 25° C.) with a pressing means having the female mold, not shown, of the master mold part to transfer the shapes of curved surfaces 212*a* and 212*b* to the polarizing film and obtain a polarizing film having curved surfaces 214*a* and 214*b*.

Prior to conducting curved surface processing, it is desirable to wet the polarizing film to enhance the shape-transferring property to the master mold part. The wetting treatment can be conducted, for example, by a method such as placing the polarizing film for a prescribed period in a constant-humidity, high-temperature device, spraying water in the form of a mist onto the polarizing film, and the like. The wetting can be conducted in a heated atmosphere of about 50 to 90° C.

In order to conduct curved surface processing in a state in which most of the water absorbed will be retained in the film, cooling of the wetted polarizing film is desirable. For example, a polarizing film that has been removed from a constant-humidity, high-temperature device can be placed as is at room temperature (about 20 to 25° C.) to cool the polarizing film.

In a desirable embodiment, the polarizing film that has been curved surface processed is heated to a heating temperature of equal to or higher than 105° C. but lower than 150° C. The heating temperature of the polarizing film that has been curved surface processed is the temperature of the atmosphere at which the heat treatment is conducted. The polarizing film that has been curved surface processed can be heated prior to being placed in the casting mold to prevent deformation of the polarizing film. As a result, deformation of the surface of the polarizing plastic lens, particularly the surface on the object side, can be prevented. Here, employing a heating temperature of equal to or higher than 105° C. can prevent deformation well and employing a temperature of lower than 150° C. can prevent the occurrence of discoloring and distortion of the polarizing film. The heating temperature is desirably equal to or higher than 120° C., and desirably equal to or lower than 130° C. This heat treatment can be conducted in air.

Various heating methods can be adopted. In one implementation mode, the polarizing film is placed in a hot air-circulating oven that has been heated to the temperature set forth above and exposed to a hot air flow. Heating is conducted until the polarizing film shrinks adequately.

As shown in FIG. 7(B), once film member 210 has been curved surface processed, desirably without separating glass mold 260 and film member 210, heating is conducted. That is, the polarizing film (film member 210) that has been curved surface processed is maintained on the curved surface 261 of glass mold 260 and heated. The amount of shrinkage of uniaxially stretched polarizing film will vary by direction. Thus, the shape of the curved surface will sometimes end up changing from the set shape. If held by curved surface 261 of glass mold 260, it is possible to cause film member 210 to shrink along the shape of curved surface 261 of glass mold 260. Thus, relative to the case when heating is conducted without glass mold 260, the curvature and shape of curved surface 212 can be more precisely molded.

As shown in FIG. 7(C), film member 210 is then cut along the dotted lines K in the figure. It is thus possible to obtain a polarizing film 14 that has been curved surface processed and has a convex shape, as indicated by the sectional view in FIG. 6(B).

It is possible to obtain a polarizing plastic lens in which a curved surface processed polarizing film has been sandwiched between two lens substrates by placing the polarizing film that has been curved surface processed as set forth above in a casting mold after the reversing step, described further below, and molding a lens by the casting method. The polarizing plastic lens is normally surface processed, edge processed, and mounted into a frame to obtain eyeglasses or sunglasses equipped with polarizing plastic lenses as set forth above.

(Reversing Step)

Figure 8:
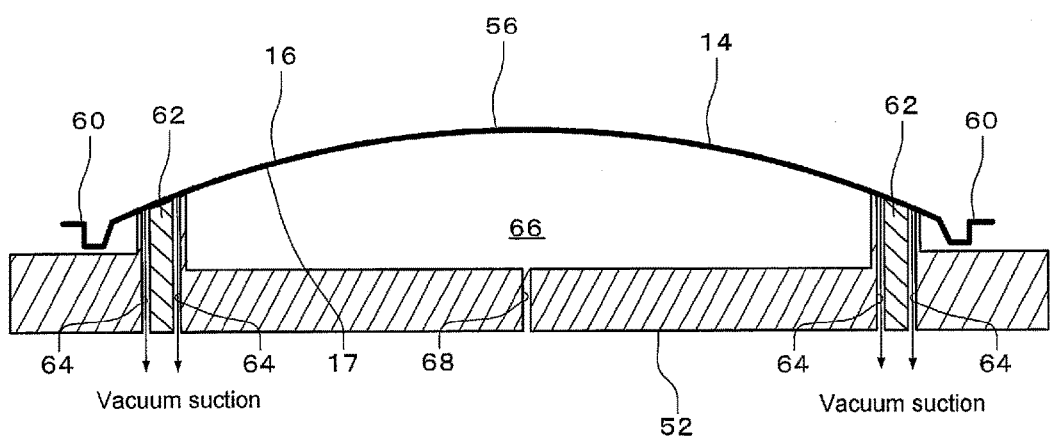
FIG. 8 A sectional view schematically showing a polarizing film relating to the present implementation mode being held in a film holding member.

FIG. 8 is a sectional view schematically showing the state of polarizing film 14 relating to the present implementation mode held in film holding member 52. Polarizing film 14 shown in FIG. 8 comprises a convex surface (curved portion) 56 and a bend portion 60. For details on the bend portions, reference can be made to Japanese Unexamined Patent Publication (KOKAI) No. 2009-103773.

The curvature of convex surface 56 is set based on the base curve (curvature of surface 111 (see FIG. 1) on the object side) of the polarizing plastic lens 100 being manufactured.

The reversing step can comprise a holding step, a cutting step, and a pressing step.

(Holding Step)

In the holding step, as shown in FIG. 8, polarizing film 14 is held on film holding member 52. Holes 64 are formed in the outer circumference portion (outer ring portion) 62 of film holding member 52, which are connected to a pump, not shown. Accordingly, polarizing film 14 can be stably held by setting polarizing film 14 on the outer circumference portion 62 and vacuum-suctioning through holes 64. The surface portion of outer circumference portion 62 of film holding member 52 is not flat in shape. A curved surface portion has been radially formed so as to be identical to, or approximate, the curvature of the polarizing film, making it possible to stably hold the polarizing film without deformation.

Film holding member 52 has a concave portion 66 in a center portion surrounded by the outer circumference portion. In the present implementation mode, the diameter of concave portion 66 is of a delimination size that is capable of holding polarizing film 14, the bend portion of which has been cut, so as to facilitate reversal of polarizing film 14. For example, when the diameter of concave portion 66 is 10 mm smaller than the diameter of polarizing film 14 after cutting, a good state of having been turned inside out can be achieved. Specifically, when the diameter of polarizing film 14 after cutting is 80 mm, the diameter of concave portion 66 is made 70 mm.

To prevent concave portion 66 from being pressure-reduced and polarizing film 14 from deforming in the course of causing rear surface 17 of polarizing film 14 to be held down by suction with the outer circumference portion 62, concave portion 66 in the present implementation mode has a passage (ventilation hole) 68 for releasing air. As needed, air can be fed to concave portion 66 through passage 68. A film holding member having one passage 68 is shown in FIG. 8, but the number of passages is not limited to one; a plurality of two or more is possible. As an example, FIGS. 24(B) and (D), described further below, depict embodiments having four passages 68.

Figure 9:
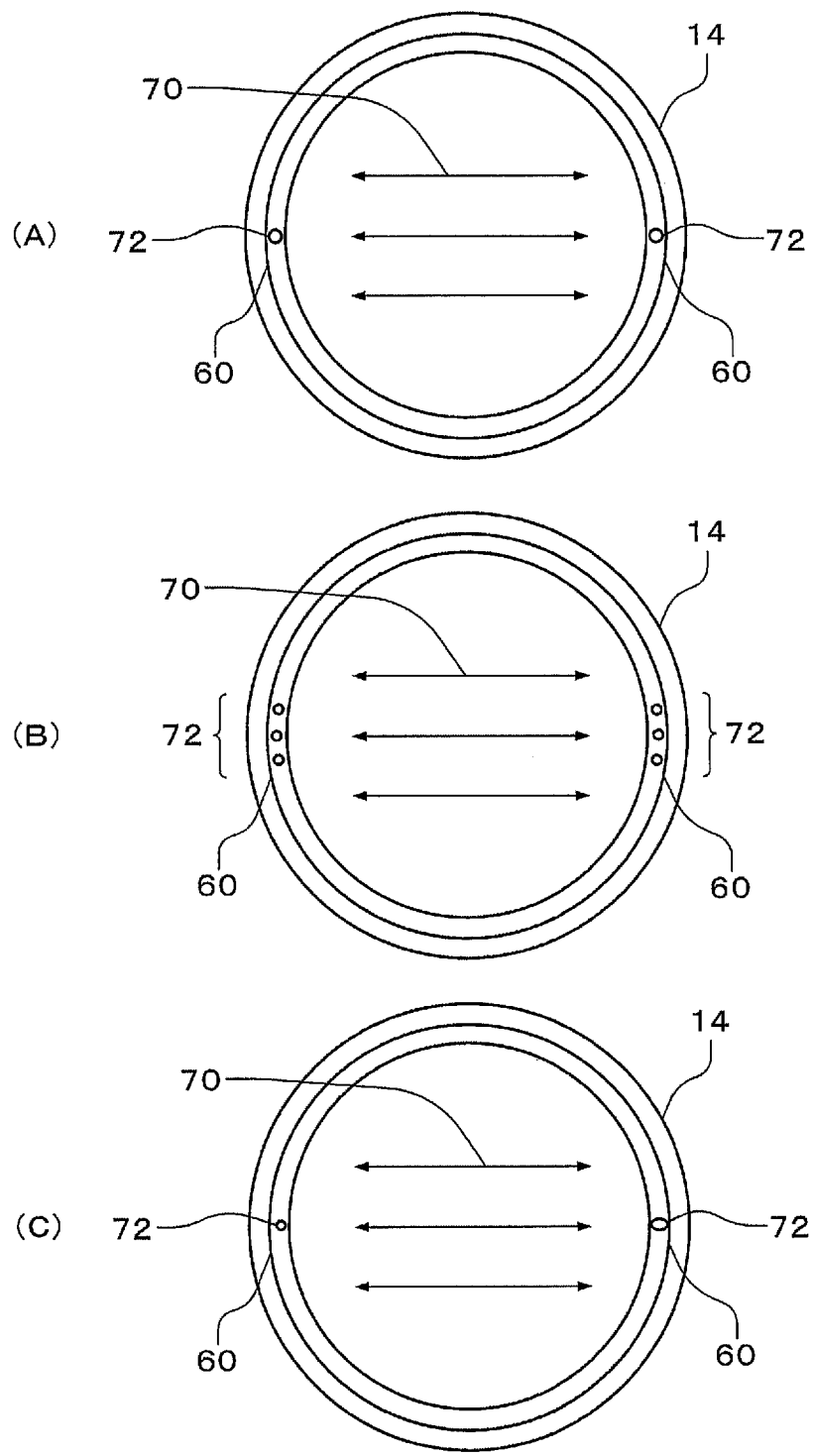
FIG. 9 Schematic drawings descriptive of positioning of the polarization axis of a polarizing film relating to the present implementation mode. Each of (A) to (C) shows a polarizing film.

FIG. 9 is a schematic drawing describing the positioning of the polarization axis 70 of polarizing film 14 relating to the present implementation mode. It is desirable to position polarizing film 14 in the holding step. As shown in FIG. 9(A), holes 72 indicating the direction of polarization axis 70 have been fashioned in bend portion 60 of polarizing film 14. The positions of holes 72 indicate the direction of the polarization axis 70 of polarizing film 14, and are used to position polarization axis 70 of polarizing film 14. As shown in FIG. 9(B), the number of holes 72 does not matter so long as the direction of polarization axis 70 can be determined. As shown in FIG. 9(C), the shape of holes 72 is not limited to round; any shape such as polygonal and ellipsoid is possible. So long as positioning is possible, there is no limitation. It is also possible to employ a polarizing film 14 in which holes 72 have been formed in advance.

Figure 10:
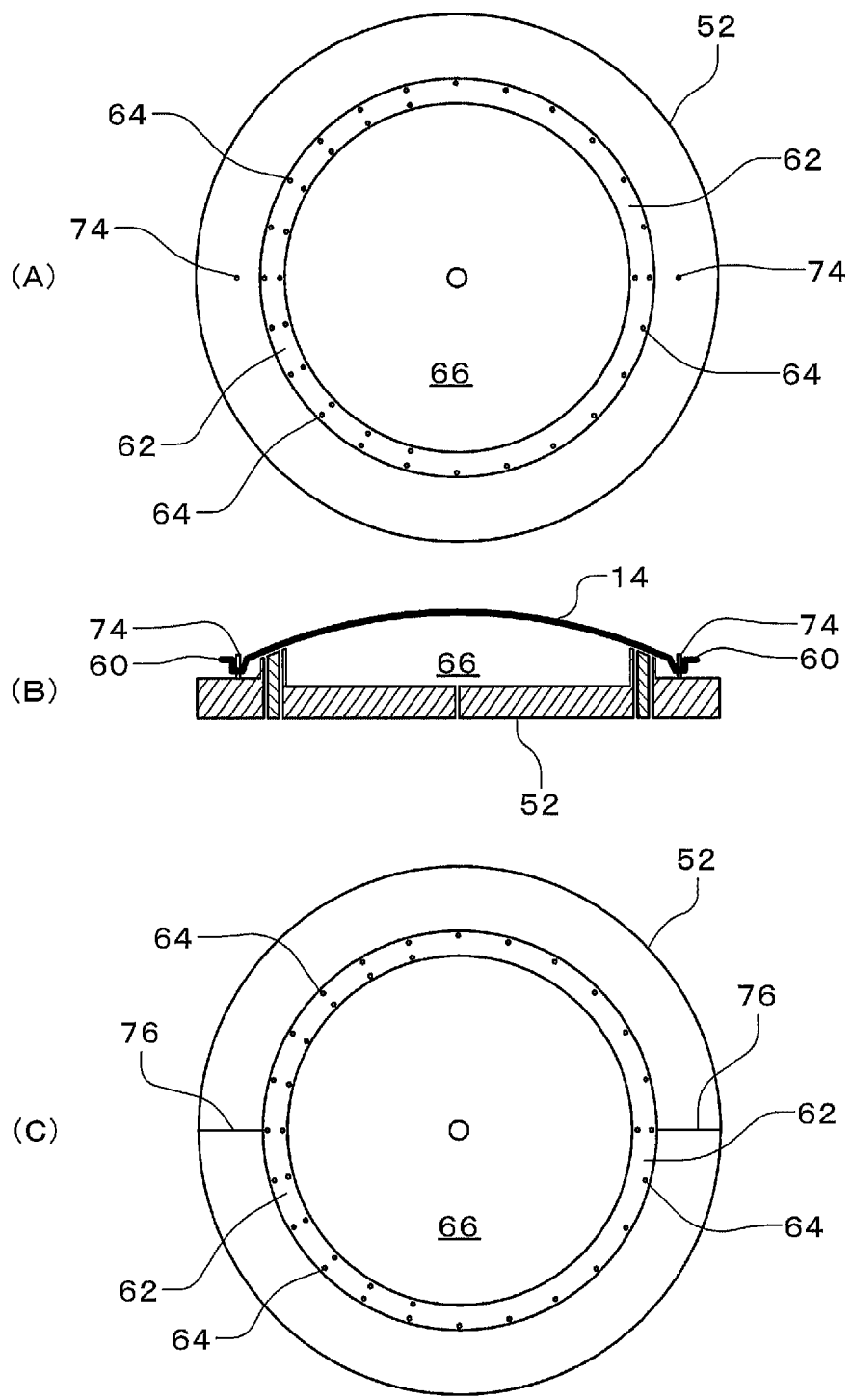
FIG. 10 Drawings showing the method of positioning the polarization axis of a polarizing film relating to the present implementation mode. (A) and (C) show film holding members. (B) shows the polarizing film being held by the film holding member.

FIG. 10 is a drawing showing the method of positioning polarization axis 70 of polarizing film 14 relating to the present implementation mode. More specifically, FIG. 10(A) is a top view of an embodiment of the film holding member and FIG. 10(B) is a sectional view of the polarizing film placed on the film holding member shown in FIG. 10(A). FIG. 10(C) is a top view of another embodiment of the film holding member.

As shown in FIG. 10(A), positioning pins 74 are provided at positions to the outside of outer circumference portion 62 relative to concave portion 66 in film holding member 52. That is, positioning pins 74 are set in spots that overlap with bend portion 60 when polarizing film 14 is held on film holding member 52. When polarizing film 14 is held on film holding member 52, as shown in FIG. 10(B), polarizing film 14 is positioned so that the positioning pins 74 of film holding member 52 insert into the holes 72 of polarizing film 14. Thus, it is possible to determine the direction of the polarization axis 70 of polarizing film 14 with respect to film holding member 52. In addition to axis positioning employing positioning pins 74, as shown in FIG. 10(C), it is possible to align holes 72 indicating the polarization axis 70 of polarizing film 14 with a positioning reference line 76 provided in advance on film holding member 52. When employing positioning reference line 76, it is also possible to print or record marks on polarizing film 14 instead of holes 72.

(Cutting Step)

Figure 11:
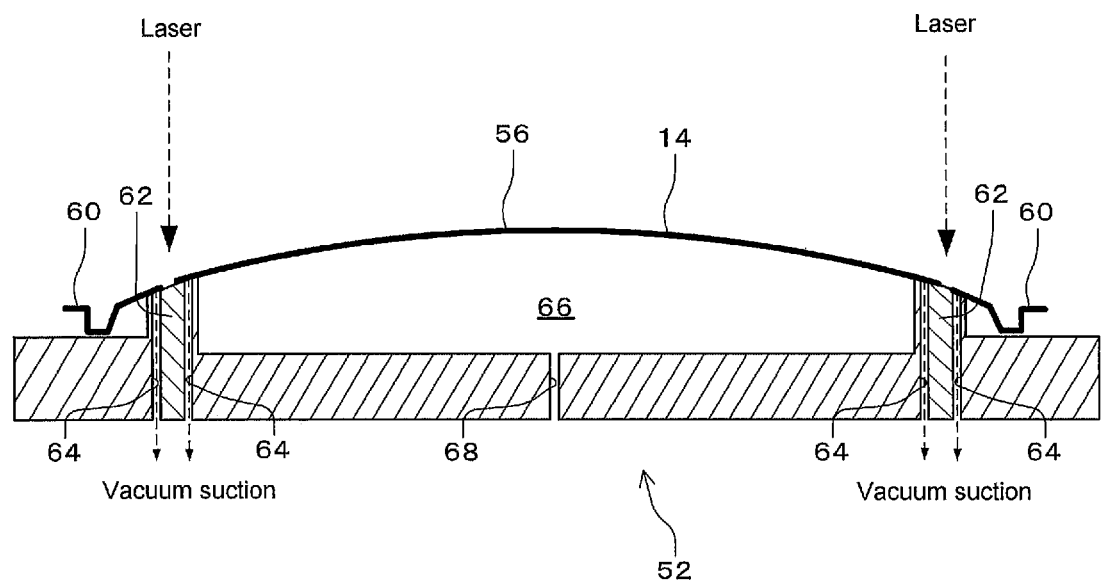
FIG. 11 A sectional view schematically showing cutting of the curved surface portion of a polarizing film relating to the present implementation mode.

FIG. 11 is a sectional view schematically showing the cutting of bend portion 60 of polarizing film 14 relating to the present implementation mode. In the cutting step, as shown in FIG. 9, the bend portion 60 of the outer circumference of polarizing film 14 is cut. In order to hold the polarizing film 14 (concave surface 56) that has been separated by cutting and bend portion 60 on film holding member 52 following cutting, holes 64 of film holding member 52 are provided on the inside (concave portion 66 side) of outer circumference portion 62 and the outside (side where positioning pins 74 are present) thereof. The positions of holes 64 have been determined in conjunction with the cutting diameter to afford reliable vacuum suction after cutting. Here, holding bend portion 60 that has been cut on film holding member 52 can prevent bend portion 60 from hindering movement of polarizing film 14 (curved portion 56) in subsequent steps. When bend portion 60 is removed immediately after cutting, it is possible not to have holes 64 that hold bend portion 60 in place by suction. $CO_2$ laser cutting is a desirable method of cutting.

(Pressing Step)

Figure 12:
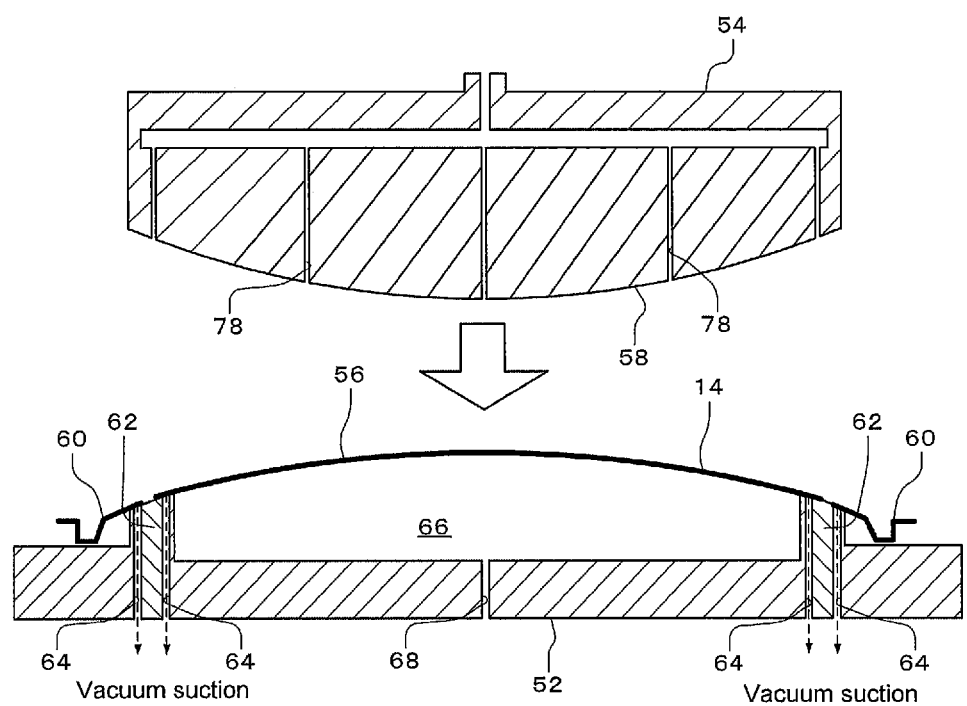
FIG. 12 A sectional view schematically showing a polarizing film relating to the present implementation mode that faces a pressing member.

FIG. 12 is a section view schematically showing how the polarizing film 14 relating to the present implementation mode and pressing member 54 are faced. In the pressing step of the present implementation mode, pressing member 54 and polarizing film 14 are first brought into contact. As shown in FIG. 12, pressing member 54 is prepared as a jig for receiving polarizing film 14 that has been turned inside out. A dome-shaped surface (convex surface 58) of the same curvature as polarizing film 14 is provided on pressing member 54. The convex surface 56 of polarizing film 14 is faced with the convex surface 58 of pressing member 54, and the top of convex surface 56 of polarizing film 14 is brought into contact with the top of convex surface 58 of the pressing member.

Figure 13:
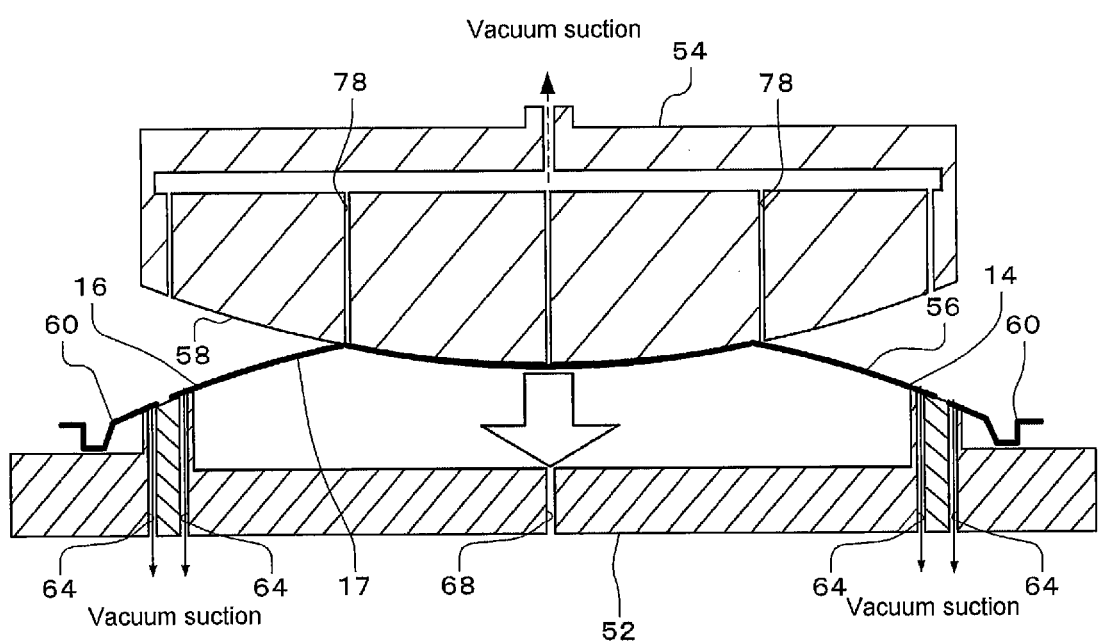
FIG. 13 A section view schematically showing a pressing member relating to the present implementation mode pressing against a polarizing film.

FIG. 13 is a section view schematically showing how pressing member 54 relating to the present implementation mode and polarizing film 14 are pressed together. As shown in FIG. 13, the convex surface 58 of pressing member 54 and the convex surface 56 of polarizing film 14 are pressed together. Specifically, either one of, or both, polarizing film 14 (film holding member 52 having a concave portion) and dome-shaped pressing member 54 are moved. Holes 78 are provided in dome-shaped pressing member 54. Once pressing member 54 has been brought into contact with polarizing film 14, holes 78 are used to hold down by suction the first surface 16 of polarizing film 14, thereby preventing misalignment of polarizing film 14 before and after polarizing film 14 is received on pressing member 54 from film holding member 52.

FIG. 14(A) is a sectional view schematically showing polarizing film 14 that has been turned inside out by bring pressing member 54 into proximity with film holding member 52 relating to the present implementation mode. FIG. 14(B) is a schematic drawing showing an example of film holding member 52. As shown in FIG. 14(A), bringing dome-shaped pressing member 54 almost into contact with the outer circumference portion 62 of film holding member 52 and pressing polarizing film 14 reverses the convex/concave surface shapes such that the convex surface of the surface 56 of polarizing film 14 becomes a concave surface and the concave surface of rear surface 66 becomes a convex surface.

At this time, in addition to causing the convex surface 16 of polarizing film 14 to dent to the rear surface (concave surface) 17 side, the edge of concave surface 17 is pressed to the convex surface side of polarizing film 14. Specifically, the vacuum suction by holes 64 of film holding member 52 that is holding polarizing film 14 is stopped. Air is then jetted through holes 64 toward the edge of rear surface 17 of polarizing film 14 to assist the reversal of polarizing film 14. The gas that is jetted through holes 64 can be any gas without restriction so long as it is a gas that does not change the property of polarizing film 14. For example, nitrogen gas, helium gas, oxygen gas, and a mixed gas or the like of any two or more of the above gases can be employed. It is also possible for pins or the like to be brought into contact with and pressed against polarizing film 14. The use of a gas rather than pressing with pins or the like tends not to scratch polarizing film 14 and thus can improve the yield.

It is also possible that air is not jetted through all of holes 64 among the holes 64 that have stopped providing vacuum suction, but can be jetted through some of holes 64 to facilitate the inside out reversal. For example, as shown in FIG. 14(B), concentrating holes 64 holding polarizing film 14 on the inside to within a range of equal to or less than 180° of outer circumference portion 62 will produce an imbalance in the air jetting and have the effect of facilitating the inside out reversal of polarizing film 14. Pressing member 54 has holes 78 and holds down by suction convex surface 16 of polarizing film 14. Thus, suction from the convex surface 16 side can assist the inside out reversal of polarizing film 14. Holes 64 that hold down by suction bend portion 60 continue to produce vacuum suction until completion of the reversal of polarizing film 14. In this manner, polarizing film 14 can be reversed so that the state where the surface 16 of polarizing film 14 is the convex surface changes to a state where the rear surface 17 becomes the convex surface. The polarizing film 14 that is subjected to the reversing step following curved surface processing has less of a tendency to curl than a polarizing film 14 that has not been through the reversing step. Thus, the shape of polarizing film 14 that has been curved surface molded can be stabilized through the completion of polymerization.

(Measuring Step)

Figure 15:
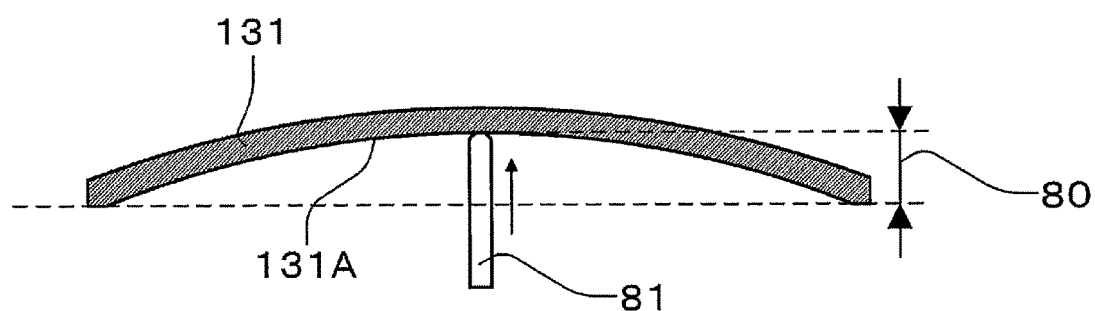
FIG. 15 A drawing showing a method of measuring the indentation depth (sag value) of a convex surface mold relating to the present implementation mode.

FIG. 15 is a drawing showing a method of measuring the depth of the indentation 80 of the upper mold 131 relating to the present implementation mode. In measuring the depth of indentation 80 of upper mold 131, as shown in FIG. 15, a contact displacement sensor 81 measures the height at the top of concave surface 131A of upper mold 131. The displacement sensor 81 that is employed can be, for example, of the GT series or AT series manufactured by Keyence Corporation. Instead of a contact displacement sensor, a noncontact sensor such as a reflection laser sensor or ultrasonic waves can be employed as the measurement method. Depth of indentation 80 can also be measured in advance. In that case, it is possible to measure just the height at the center of polarizing film 14 in the measuring step.

Figure 16:
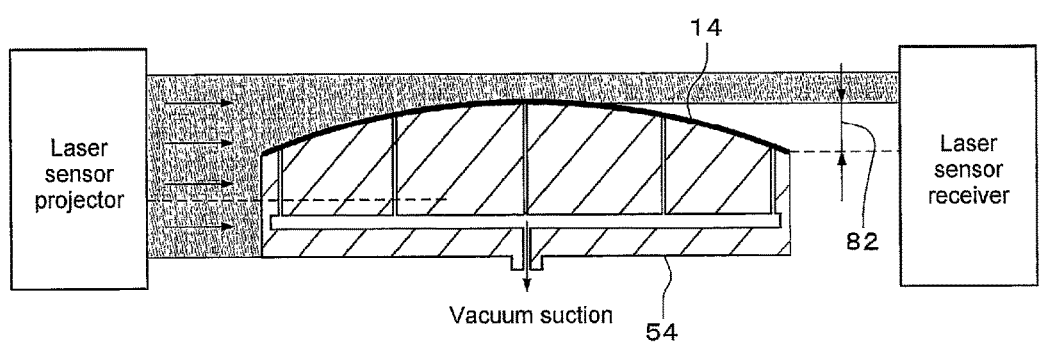
FIG. 16 A drawing showing a method of measuring the height of a polarizing film relating to the present implementation mode.

FIG. 16 is a drawing showing a method of measuring the height of polarizing film 14 relating to the present implementation mode. Measurement is conducted with a contact displacement sensor or noncontact displacement sensor. Although depending on the material, since polarizing film 14 generally tends to deform and be scratched by contact, as shown in FIG. 16, in measurement of height 82 at the center of polarizing film 14, it is desirable to measure the height at the top of polarizing film 14 with a transmission laser sensor of the noncontact type. For example, measurement can be conducted with a CCD transmission digital laser sensor (IG series) made by Keyence Corporation. In this process, the measurement is desirably conducted with polarizing film 14 held in film holding jig 54 so that the shape of polarizing film 14 is rendered stable.

<Assembling of Casting Mold>

The polarizing film that has been subjected to the above reversing step is placed in the cavity of a casting mold and molded into a plastic lens by a casting method to provide a polarizing plastic lens with a polarizing film embedded within it. The method of positioning the polarizing film in the casting mold is not specifically limited. Assembling the casting mold with the polarizing film being held by at least either the upper mold or the lower mold is desirable because it makes it possible to assemble the casting mold without having to prepare a gasket with a film-holding part. A method of molding by the casting method a polarizing film through a step of holding the polarizing film in the upper mold will be described below as an implementation mode.

The above implementation mode comprises:

an upper mold positioning step of positioning the upper mold so that the nonmolding surface faces up and the molding surface faces down;

an adhesive column forming step of discharging a thixotropic curable adhesive from a discharge nozzle positioned beneath the molding surface of the upper mold to form adhesive columns on the rim portion of the molding surface of the upper mold;

a bonding step of bonding the upper mold and the polarizing film by means of the adhesive columns that have been formed;

an adhesive column curing step of subjecting the adhesive columns to a curing treatment after the bonding step;

a casting mold assembling step of assembling a casting mold having a cavity within which the polarizing film has been positioned with the upper mold to which the polarizing film has been bonded, a lower mold positioned opposite the upper mold so as to sandwich the polarizing film, and a sealing member maintaining a spacing between the upper mold and lower mold; and a polymerizing and curing step of casting a curable composition into the cavity, and polymerizing and curing the curable composition that has been cast to provide a polarizing plastic lens within which the polarizing film is positioned.

(Upper Mold Positioning Step and Adhesive Column Forming Step)

Figure 17:
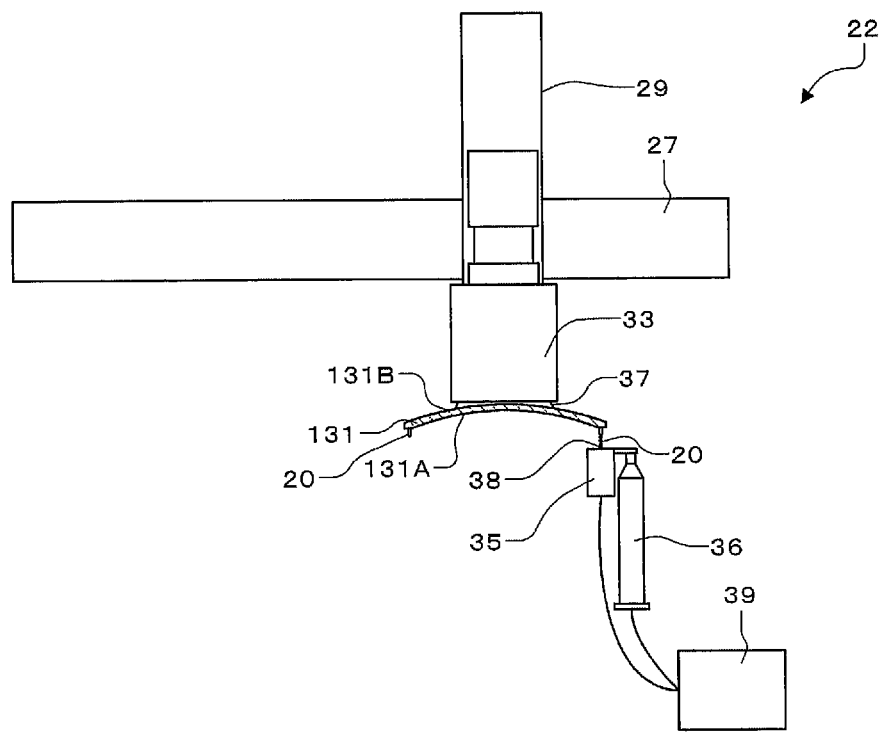
FIG. 17 A drawing showing the discharge device discharging adhesive relating to the present implementation mode.

FIG. 17 is a drawing showing a discharge device 22 that conducts the upper mold positioning step and adhesive column forming step relating to the present implementation mode.

Discharge device 22 relating to the present implementation mode is equipped with an X cylinder 27 moving in a direction perpendicular to the direction in which gravity acts (also referred to as the "horizontal direction", hereinafter); a Z cylinder 29 moving vertically in the direction in which gravity acts (also referred to as the "vertical direction", hereinafter), a spindle 33 supported by X cylinder 27 and Z cylinder 29; a dispenser 35, and a syringe 36.

A flexible vacuum pad 37 is positioned beneath spindle 33 (FIG. 17 gives a lateral view). When discharge device 22 is holding upper mold 131, vacuum pad 37 comes into contact with the nonmolding surface (convex surface 131B) of upper mold 131. Thus, the molding surface (convex surface) 131B of upper mold 131 is held beneath spindle 33. That is, the molding surface (concave surface) 131A of upper mold 131 is facing downward.

Dispenser 35 positioned beneath the molding surface of the upper mold discharges upward adhesive that has been loaded in advance into syringe 36, thereby forming adhesive columns 20. Dispenser 35 is controlled by dispenser control element 39, discharging adhesive 20 in a constant discharge quantity through nozzle 38. Concave surface 131A is facing downward. Thus, adhesive column 20 that is formed at the position of discharge of concave surface 131A sags downward. For example, above-cited Japanese Unexamined Patent Publication (KOKAI) No. 2012-198689 discloses a method of discharging an adhesive with a concave surface facing upward. However, in this method, the adhesive builds up due to countering the effect of gravity. Thus, adhesive column 20 becomes a lump, topping or tilting, sometimes not reaching the height prescribed by the design. When adhesive column 20 does not reach the prescribed height, it becomes difficult to position polarizing film 14 within polarizing plastic lens 100, it becomes impossible to stably hold the polarizing film, and the quality of the exterior appearance is compromised. Further, when one of the surfaces of polarizing plastic lens 100 is polished (processed), the thickness that can be polished without scratching polarizing film 14 decreases, and the thickness of the finished product lens that is obtained sometimes ends up being thicker than the thickness of an eyeglass lens not containing polarizing film 14. By contrast, by having concave surface 131A facing downward and forming adhesive column 20, gravity causes adhesive column 20 to sag downward. That makes it possible to more reliably and precisely achieve a prescribed height in adhesive column 20. Thus, it becomes possible to obtain a thinner finished product polarizing lens with a better external appearance. For example, it becomes possible to obtain a polarizing lens that can be suitably employed as a semifinished eyeglass lens. Multiple spindles 33 and dispensers 35 can be provided in discharge device 22, and a configuration that discharges multiple adhesive columns 20 on upper mold 131 is possible in a single discharge device 22. An example of dispenser 35 is the jet type dispenser Aerojet ("Aerojet" is a registered trademark) made by Musashi Engineering, Inc.

The method of forming adhesive column 20 employing discharge device 22 will be described next.

Once upper mold 131 has been positioned, dispenser 325 discharges adhesive onto the outer circumference portion of upper mold 131. As shown in FIG. 17, upper mold 131 is positioned on the vacuum pad 37 of spindle 33. X cylinder 27 and Z cylinder 29 are driven to suitably adjust the position of the upper mold, and nozzle 38 is positioned at a position facing the outer circumference portion of concave surface 131 of upper mold 131. Dispenser 35 is driven. That is, spindle 30 is rotated to turn upper mold 131 in a circumferential direction. Once the position at which the adhesive of upper mold 131 is discharged reaches above nozzle 38, dispenser 35 is driven to discharge adhesive through nozzle 38 onto the outer circumference portion of concave surface 131A facing downward in the direction in which gravity acts. This forms an adhesive column 20 that sags downward in the direction in which gravity acts at the discharge position of concave surface 131A.

Discharge device 22 discharges adhesive until adhesive column 20 reaches a prescribed height (length). The height (length) of adhesive column 20 at a given discharge position refers to the distance between the top of adhesive column 20 and the point of intersection with concave surface 131A of a vertical line run downward to concave surface 131A from this top. The height of the adhesive column can be determined based on the height at which one desires to maintain polarizing film 14. For example, in the case where the curvature of film 14 is identical to the curvature of concave surface 131A, it is desirably equal to or higher than 0.1 mm but equal to or less than 1.0 mm. By keeping it to equal to or higher than 0.1 mm but equal to or less than 1.0 mm, it is possible to achieve a minimum value of the distance between polarizing film 14 on polarizing plastic lens 100 and the convex surface 111 of within a range of equal to or higher than 0.1 mm but equal to or less than 1.0 mm. With the minimum value of the distance between polarizing film 14 and convex surface 111 is equal to or higher than 0.1 mm but equal to or less than 1.0 mm, when manufacturing a finished product lens by polishing the concave surface side of the lens, the thickness (thickness of the thinnest portion) of the finished product lens that is obtained can be made a lens thickness of equal to or less than 1.1 mm, which is equivalent to the thickness of an eyeglass lens not containing polarizing film 14. Accordingly, it is possible to achieve a thickness that is equivalent to an eyeglass lens not containing polarizing film 14 in an eyeglass lens containing polarizing film 14. For example, the adhesive column has a rod shape or a shape approximating a rod. However, this is not a limitation. It can have any lump shape, such as a square rod.

When the height 82 of the center of polarizing film 14 is greater than the concave portion depth 80 of upper mold 131 (when the radius of curvature of polarizing film 14 is smaller than that of upper mold 131), the spacing is controlled based on the center of upper mold 131 and polarizing film 14. In this case, it is because the center portion of polarizing film 14 ends up contacting upper mold 13 when the spacing is determined based on the outer circumference. When the height 82 of the center of polarizing film 14 is less than the concave portion depth 80 of upper mold 131 (when the radius of curvature of polarizing film 14 is greater than that of upper mold 131), the spacing is controlled based on the outer circumference portion of upper mold 131 and polarizing film 14. In this case, this is because when the spacing is determined based on the center, the outer circumference of polarizing film 14 ends up coming into contact with upper mold 131. When the concave portion depth 80 of upper mold 131 equals the height 82 at the center of polarizing film 14, it suffices to adjust the spacing anywhere. The top that is employed in an eyeglass lens or the area around the top is desirably employed as a reference.

Further, when polarizing film 14 is bonded in the manner described further below to adhesive column 20 of prescribed height, the top will sometimes be slightly quashed, changing the height. In that case, the height of adhesive column 20 is desirably set in advance to a height that is increased by the amount of the reduction in height due to bonding of polarizing film 14.

In the present implementation mode, a single discharge device discharges adhesive multiple times to adjust the amount of adhesive that is discharged at a particular position. To reliably form adhesive column 20 of prescribed height, the discharge nozzle is desirably positioned straight down at the spot where the adhesive column is to be formed. It is preferable for adhesive to be discharged directly upward through the discharge nozzle thus positioned. The angle between concave surface 131A and the direction of discharge of the adhesive is desirably constant at the multiple spots where adhesive columns are to be formed. This can inhibit variation in the height of adhesive columns 20 at various spots when identical quantities of adhesive are discharged.

The height of adhesive column 20 can be controlled by adjusting the quantity of adhesive that is discharged at the spots where adhesive columns are to be formed. In order not to adhere adhesive in spots where the formation of an adhesive column is not wanted, a gap is desirably provided between nozzle 38 and the concave surface 131A. That is, it is desirable for adhesive droplets to be scattered through nozzle 38 in conducting the discharge. The quantity of adhesive that is discharged through nozzle 38 each time can be reduced. However, the greater the quantity of the adhesive that is discharged, the harder it becomes to scatter adhesive in the form of adhesive droplets.

To ensure an effective diameter (the size of the area that can be utilized as an eyeglass) in the finished product polarizing lens, the position at which adhesive column 20 is formed is the rim portion of upper mold 131, desirably to the outside of the effective diameter of the finished product polarizing lens that is obtained when processing polarizing plastic lens 100. The position at which adhesive column 20 is formed can be a region that is removed in a lens rounding step or the like that removes the bur or adjusts the shape of the rim portion of molded polarizing plastic lens 100 to a circular shape, or can be a region of the lens rim portion that remains. It suffices for it to be a region that is cut when the lens is mounted into a frame that has been selected by a customer. It is desirably a region that is removed by grinding to improve the impression created by the external appearance when polarizing plastic lens 100 is distributed on the market. When adhesive column 20 does not affect the optical performance of the finished product polarizing lens, it is possible to form the adhesive column within the effective diameter. The diameter of adhesive column 20 is desirably the smallest diameter capable of holding polarizing film 14 from the perspectives of facilitating mold release, cleaning upper mold 131 after mold release, and the minimization of the amount of the outer perimeter (edge surface) of polarizing plastic lens 100 that is shaped. The diameter of the adhesive column can be adjusted based on the inner diameter of the opening of nozzle 38. For example, the diameter desirably falls within a range of 1.0 to 2.0 mm To prevent scattering of adhesive and the reliable buildup of adhesive at desired positions, the distance between upper mold 131 and the dispenser discharge outlet is desirably equal to or less than 50 mm, preferably equal to or less than 30 mm. When dispenser 35 repeatedly dispenses adhesive, adhesive deposits near the opening of nozzle 38, compromising discharge performance. Thus, it is desirable to regularly clean the area around the opening of nozzle 38. This cleaning can be conducted by the method of suctioning away unwanted adhesive by means of a vacuum. It can also be conducted by wiping with a sponge, cloth, or paper. In addition to manual operations, it is possible to add a cleaning mechanism to discharge device 22. Making a blank shot prior to discharging onto upper mold 131 can yield a stable discharge from the beginning.

In discharging the adhesive, displacing the discharge nozzle downward is desirable to adjust the spacing between the tip of the adhesive column and the tip of the discharge nozzle. To this end, either one or both of the upper mold and the discharge nozzle are displaced. For example, the longer the adhesive column, the more the discharge nozzle is displaced downward or the more the upper mold is displaced upward to keep the spacing between tip of the adhesive column and the tip of the discharge nozzle constant. In this case, it is desirable to move the adhesive in a direction in which the angle of discharge relative to concave surface 131A does not change.

The adhesive that is used to form the adhesive column will be described next.

The adhesive that is employed to form the adhesive column in the present implementation mode is both thixotropic and curable. This can prevent deformation of the adhesive column and make it possible to control the gap between the upper mold and the polarizing film, that is, the spacing from the convex surface to the polarizing film in the polarizing plastic lens being manufactured, by means of the height of the adhesive column. This point will be further described. In the present implementation mode, the adhesive column that is formed on the rim portion of the molding surface of the upper mold faces downward, that is, in the direction in which gravity acts. Thus, it does not topple the way adhesive columns that are provided facing upward do. However, the adhesive column performs the role of regulating the gap between the molding surface of the mold and the polarizing film. An adhesive column that is formed facing downward ends up being deformed by gravity, making it difficult to control the gap between the molding surface of the mold and the polarizing film. In the present implementation mode, this problem is resolved by using a thixotropic adhesive. The property of thixotropy refers to a property whereby the viscosity decreases with stirring and increases when left standing (JIS K6800). It is a physical property whereby the shape is maintained when no pressure is applied, but fluidity increases greatly when pressure of more than a certain degree is applied. Since no pressure is applied to the thixotropic adhesive columns that are formed on the rim portion of the molding surface of the upper mold prior to bonding of the polymerizing film, there is no deformation due to gravity and the shape can be maintained. Subsequently, the adhesive columns, which have been caused by pressure applied during bonding to the polymerizing film to deform in a manner such that they stably contact and hold the polymerizing film, are solidified by the curing treatment. This can prevent the gap between the upper mold and the polarizing film from changing due to subsequent unintended deformation. Thus, in the present implementation mode, it is possible to control the gap between the upper mold and the polarizing film, that is, the spacing between the convex surface in the polarizing plastic lens that is manufactured and the polarizing film, by means of the height of the adhesive columns.

The use of an adhesive with a thixotropy coefficient of equal to or greater than 2 is desirable, greater than 2 is preferred, equal to or greater than 2.5 is of greater preference, and equal to or greater than 3 is of still greater preference. The thixotropy coefficient is an indicator of the degree of thixotropy. The larger it is, the greater the shape retaining property. The thixotropy coefficient is calculated as the ratio [V2/V1] of the viscosity V2 measured at 1/10 of an Arpm rotational speed to the viscosity V1 measured at an Arpm rotational speed with a viscometer. The rotational speed A is not specifically limited, and normally falls within a range of 1 to 100 rpm. In the present invention, the viscosity is the value that is measured using a cone plate viscometer under conditions of a cone angle of 3° and a measurement temperature of 25° C. The thixotropy coefficient is, for example, equal or less than 5. The greater the thixotropy, the better from the perspective of maintaining the shape of the adhesive columns. Thus, there is no upper limit. From the perspective of better retaining the shape of the adhesive column, the viscosity of the adhesive is desirably equal to or higher than 30,000 mPa·s, preferably equal to or higher than 35,000 mPa·s. The greater the viscosity, the better from the perspective of shape retention. From the perspective of ease of coating, an adhesive with a viscosity of equal to or less than 100,000 is desirable, one with a viscosity of less than 80,000 mPa·s is preferred, and one with a viscosity of equal to or less than 70,000 mPa·s is of greater preference. As regards curability, an adhesive exhibiting a thermosetting property of curing when heated or an adhesive exhibiting a photosetting property of curing when irradiated with light will do. From the perspective of manufacturing efficiency, a short curing period is desirable. Thus, a photosetting adhesive is desirably employed. For example, an ultraviolet-curable adhesive can be suitably employed. The adhesive can be a composition, containing, for example, a prepolymer, monomer, photopolymerization initiator, some other polymerization initiator, and additives. Because the adhesive column comes into contact with the lens monomer that is positioned within the cavity of the casting mold, an adhesive that satisfies the conditions of not dissolving into the lens monomer and not causing monomer foaming due to the generation of gas or the like is desirable. Examples of adhesives that can be suitably employed are thixotropic ultraviolet-curable acrylic resin compositions.

The position of the formation of the adhesive column will be described next.

Figure 18:
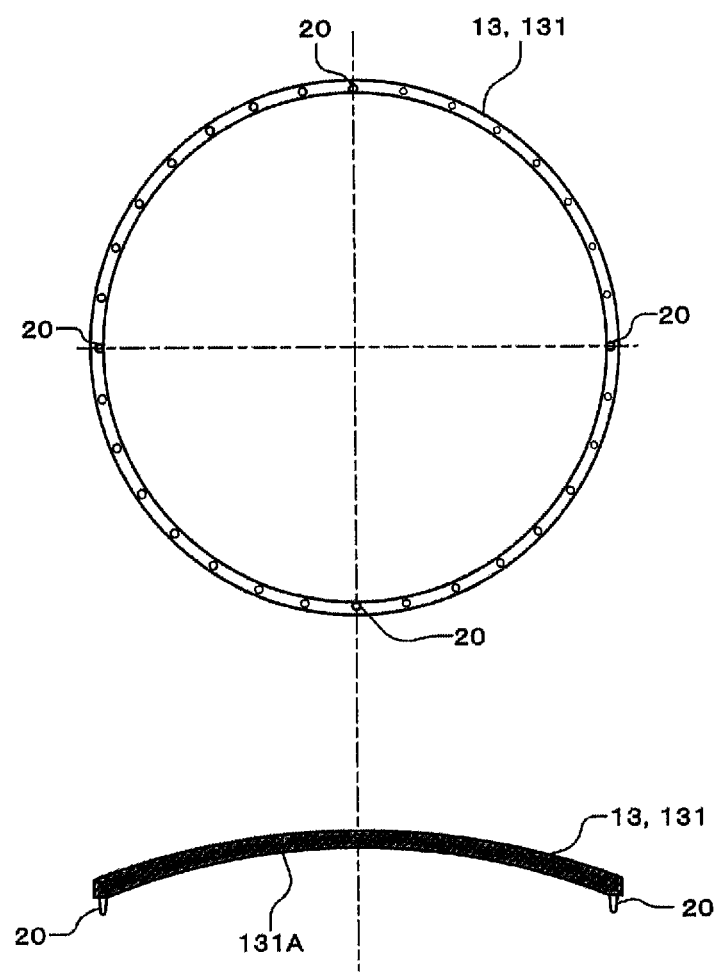
FIG. 18 A drawing showing adhesive columns 20 formed by discharging adhesive on the rim portion of an upper mold relating to the present implementation mode.

FIG. 18 is a drawing showing adhesive columns 20 that have been formed by the discharge of adhesive on the rim portion of upper mold 131 relating to the present implementation mode.

The adhesive columns are formed, for example, by discharging with a dispenser an adhesive in the form of a thixotropic ultraviolet-curable resin composition. The adhesive is discharged in multiple spots on the outer circumference portion, which is the rim, of the concave surface 131A of upper mold 131. The present implementation mode shows the embodiment of adhesive discharge at 32 spots on the outer circumference portion. The position of the adhesive discharge depends on the type of polarizing film. By way of example, there can be two or more spots, desirably four or more spots. When there are fewer than four spots, polarizing film 14 will curl in spots that have not been secured with adhesive. In some cases, it is impossible to maintain all of polarizing film 14 at a prescribed height relative to polarizing plastic lens 100. However, a polarizing film of high rigidity, such as a film on which a protective layer of TAC or the like has been formed, will tend not to curl. Thus, depending on the material of polarizing film 14, there can be two or three discharge spots.

For example, when adhesive columns are formed in about 32 spots on a polarizing plastic lens (semifinished lens) for use in high optical precision eyeglasses for refractive correction that have a lens diameter of about 65 to 80 mm, bending of the polarizing film can be kept so low as to be almost visually undetectable. In a lens about 65 to 80 mm in diameter, in terms of restrictions relating to the surface area available for discharge, the high end of the number of spots where adhesive columns are formed is normally about 50. It is desirable for the adhesive columns in the cavity not to impede the flow of lens monomer to allow the smooth filling of the cavity of the casting mold with lens monomer. Thus, the number of spots in which adhesive columns are formed, by way of example, is desirably about 8 to 50, preferably 16 to 40. When the number of spots in which adhesive columns are formed is excessive, adjacent adhesive columns end up joining together, sometimes impeding the flow of lens monomer.

When forming adhesive columns in multiple spots, it is desirable for there to be little variation in the spacing between spots, and identical spacing is preferred. That is, the adhesive columns are desirably formed at an equal spacing on the rim portion of the molding surface of the upper mold. This can facilitate maintaining all of polarizing film 14 at a prescribed height.

(Bonding Step)

Figure 19:
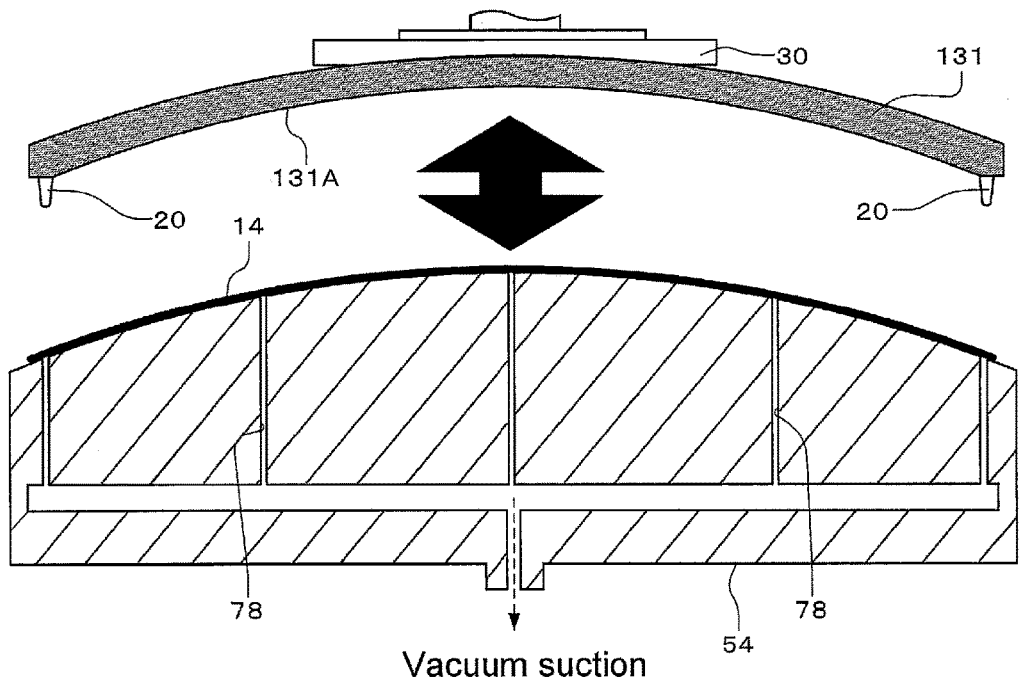
FIG. 19 A schematic sectional view of a polarizing film relating to the present implementation mode approaching a convex surface mold.

FIG. 19 is a drawing showing the polarizing film 14 and upper mold 131 relating to the present implementation mode in a state of close proximity. As indicated in FIG. 19, polarizing film 14 following the reversing step is bonded to upper mold 131 that has been measured in the above-described measuring step. More specifically, based on the depth 80 of the concave portion of upper mold 131 and the center height 82 of polarizing film 14, the concave surface 131A of upper mold 131 and polarizing film 14 are brought together in a manner that minimizes the distance between them and the adhesive columns 20 are brought into contact with polarizing film 14. Polarizing film 14 can be brought into proximity with upper mold 131. Polarizing film 14, which is being held on film holding member 54, can be brought into proximity with upper mold 131, which is being held on securing pad 30. Or, both the polarizing film and upper mold can be displaced to bring them into mutual proximity.

(Adhesive Column Curing Step)

Figure 20:
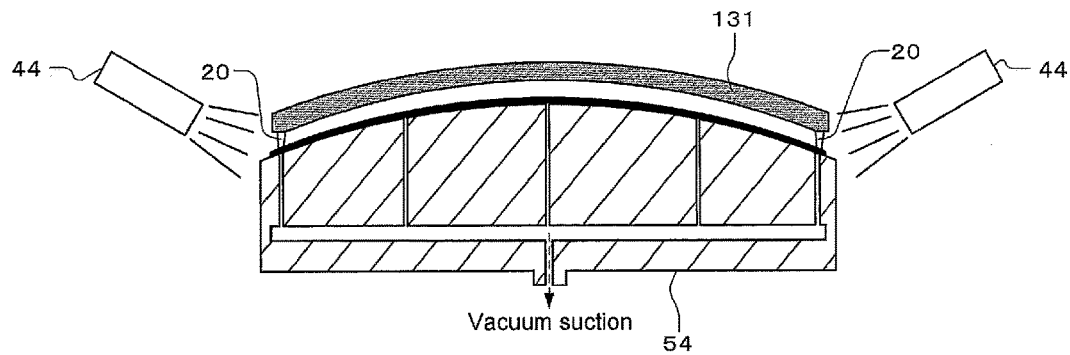
FIG. 20 A drawing showing how the polarizing film is secured to a convex surface mold relating to the present implementation mode.

FIG. 20 is a drawing showing how polarizing film 14 is secured on upper mold 131 relating to the present implementation mode. Specifically, as shown in FIG. 20, polarizing film 14 is secured to upper mold 131. An ultraviolet radiation irradiating device, not shown, is driven to irradiate ultraviolet radiation from an irradiating lamp 44 onto adhesive columns 20 and cure adhesive columns 20 and solidify the adhesive columns. The method of irradiating ultraviolet radiation can employ an LED light source instead of a lamp light source. The EXECURE series ("EXECURE" is a registered trademark) made by Hoya Candeo Optronics can be employed as an LED light source. When employing an adhesive that is curable by something other than ultraviolet radiation, it suffices to suitably conduct the processing that is required to cure the adhesive based on its properties.

(Casting Mold Assembling Step)

The polarizing film that has been through the reversing step and the upper mold are bonded through adhesive columns in the above steps. As shown in FIG. 4, the upper mold to which the polarizing film has been bonded is positioned opposite lower mold 132 and adhesive tape 46 is wound around the edge to secure them, thereby forming a cavity within which the polarizing film is positioned.

In the course of positioning lower mold 132, lower mold 132 is positioned opposite polarizing film 14 so that the thickness of cavity 50 (the distance between lower mold 132 and upper mold 131) assumes a set thickness. That is, upper mold 131 and lower mold 132 are positioned so as to sandwich polarizing film 14 across a prescribed distance. Lower mold 132 is a round, platelike member made of glass. The convex surface 132A of lower mold 132 is curved so as to mold the concave surface 121 of the polarizing plastic lens 100 that is being molded.

The material of adhesive tape 46 is not specifically limited. From the perspectives of ease of use and economy, a plastic adhesive tape is desirably employed. For example, adhesive tape 46 with a base material made of polypropylene or polyethylene terephthalate combined with one or more adhesives in the form of an acrylic, natural rubber, or silicon adhesive can be prepared. Casting holes for introducing lens monomer can be provided in adhesive tape 46. Winding adhesive tape 46 onto the circumferential surface of lower mold 132 and upper mold 131 which have been positioned opposite each other constitutes casting mold 12 comprised of upper mold 131 and lower mold 132, which sandwich polarizing film 14, and adhesive tape 46.

As set forth in detail above, in the present implementation mode, the molding surface of the upper mold and polarizing film 14 are brought into contact through adhesive columns 20 which sag downward in the direction in which gravity acts. Adhesive columns 20 are solidified with the concave surface 131A of upper mold 13 and polarizing film 14 separated by a prescribed gap to secure polarizing film 14 to the concave surface 131A of upper mold 13. Since a prescribed spacing can be maintained between polarizing film 14 and the convex surface 111 of polarizing plastic lens 100 that is being manufactured, a polarizing plastic lens 100 with an external appearance of good quality can be obtained. Although a sealing member in the form of adhesive tape has been employed in the implementation mode set forth above, the same effect can be achieved when a gasket is employed instead of tape. That is, without providing a configuration (grooves, tabs, or the like) on a gasket to hold polarizing film 14, it is possible to hold polarizing film 14 within casting mold 12 with a prescribed gap between the molding surface of upper mold 13 and polarizing film 14 and obtain a polarizing plastic lens 100 with an external appearance of good quality.

<Casting Step>

Figure 21:
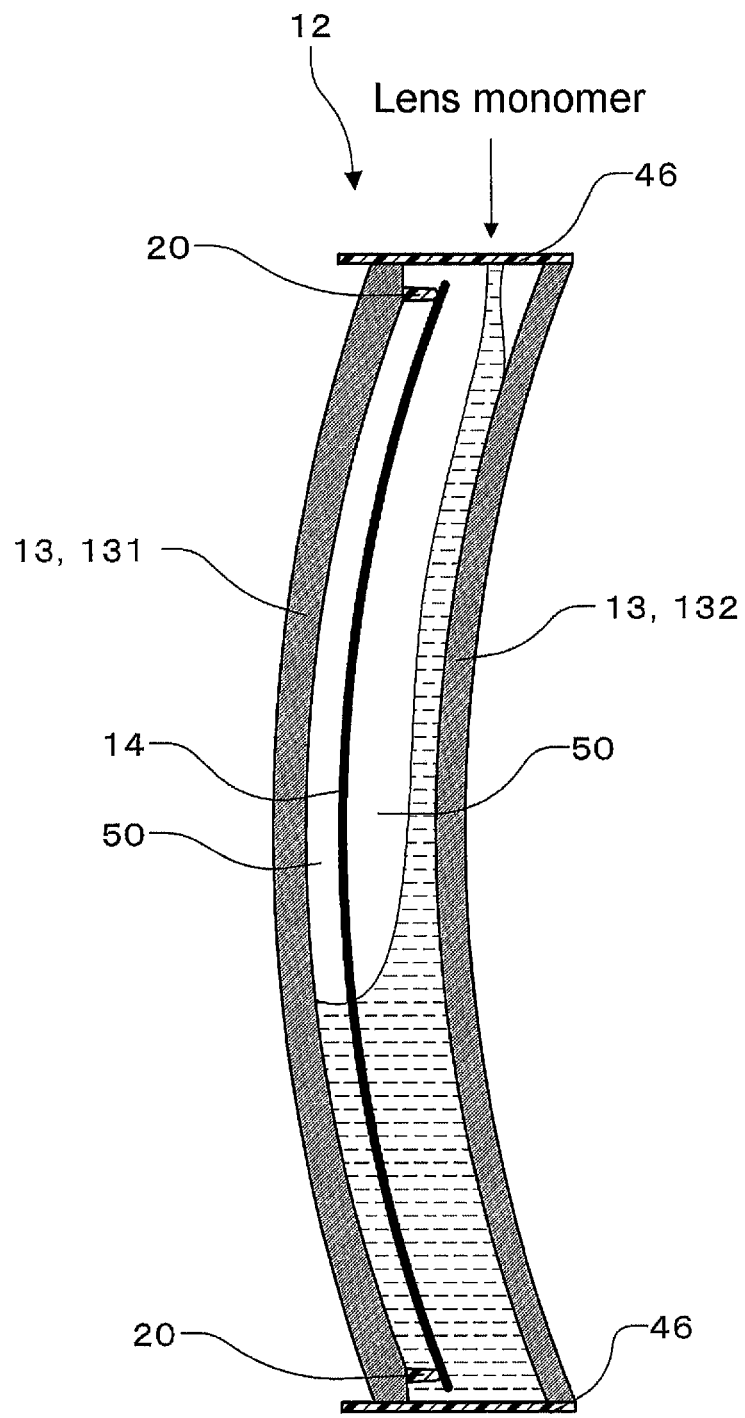
FIG. 21 A sectional view schematically showing a lens mold in a casting process relating to the present implementation mode.

FIG. 21 is a sectional view schematically showing casting mold 12 in the casting step relating to the present implementation mode. Casting mold 12 shown in FIG. 21 is positioned in the positioning member 10 of infusion machine 2 shown in FIG. 3. A control element is controlled to cast a starting material composition of plastic into cavity 50 through a casting needle, not shown, provided in casting member 25 of suctioning member 19. The details of the casting step are as set forth with reference to FIG. 3 above.

<Curing Step>

Following the casting step, casting mold 12 filled with lens monomer is placed in a heating furnace and heated. Here, the heating temperature is desirably 0 to 150° C., preferably 10 to 130° C. The temperature is desirably raised over 5 to 50 hours, preferably over 10 to 25 hours, and polymerization is conducted. For example, 30° C. is maintained for 7 hours, after which the temperature is raised from 30 to 120° C. over 15 hours.

<Mold Release Step>

Next, once the heat treatment has been concluded, a polarizing plastic lens 100 in which a polarizing film 14 is embedded is manufactured (see FIG. 2) in casting mold 12 by curing the curable composition (lens monomer). Casting mold 12 is removed from the heating furnace, adhesive tape 46 is removed, and polarizing plastic lens 100 is removed from upper mold 131 and lower mold 132.

As set forth in detail above, the rigidity of polarizing film 14 can be increased and the shape can be stabilized by deforming and reversing the concave/convex surfaces of the polarizing film that has been curved surface processed in the above implementation mode. Thus, even when the curved portion 60 of polarizing film 14 is cut away, polarizing film 14 tends not to curl and tends to retain the shape it had prior to cutting. As a result, compared to when polarizing film 14 is not reversed, it can be more readily positioned within lens mold 12 and its shape can be stabilized until the completion of polymerization of polarizing film 14 that has been curved surface processed. Thus, it is possible to achieve greater efficiency in the manufacturing steps in the course of manufacturing a polarizing plastic lens 100 holding polarizing film 14 within it. As a result, the cost of manufacturing polarizing plastic lens 100 can be reduced. Further, stabilizing the shape can enhance the quality of the external appearance of polarizing plastic lens 100 and provide greater stability.

Implementation modes are not limited to the above. Implementation is also possible in modes such as those given below.

MODIFICATION EXAMPLE 1

Figure 22:
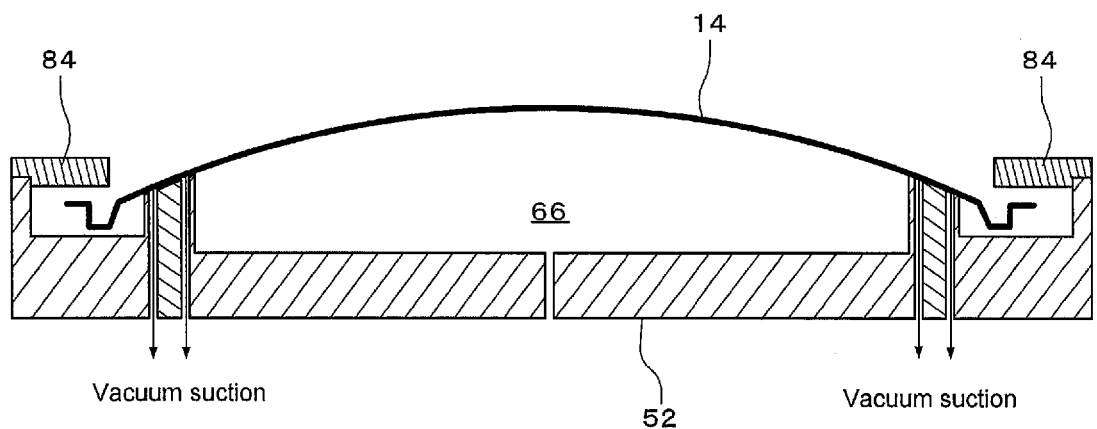
FIG. 22 A sectional view schematically showing a film holding member having a guard jig relating to modification example 1.

FIG. 22 is a sectional view schematically showing film positioning member 52 equipped with a guard jig 84 relating to the present modification example. In the above implementation mode, in the step of reversing polarizing film 14, the method of jetting air to promote the reversal of polarizing film 14 was disclosed. This jetting of air will sometimes cause problems by displacing unwanted curved portions 60 and impeding the turning inside out of polarizing film 14. Instead of vacuum suction of curved portions 60, or in combination with vacuum suction, as shown in FIG. 22, a guide jig 84 can be used to prevent curved portions 60 that have been cut off from displacing.

MODIFICATION EXAMPLE 2

Figure 23:
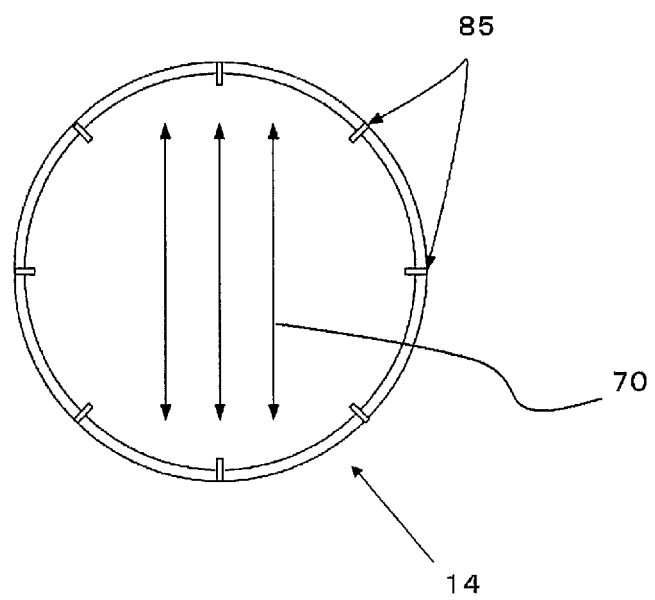
FIG. 23 A top view schematically showing a polarizing film having ribs relating to modification example 2.

FIG. 23 is a plan view schematically showing polarizing film 14 equipped with ribs 85 relating to the present modification example. In the above implementation mode, curved portions 60 were provided along the edge of polymerizing film 14. Ribs 85 (positioned in a direction that intersects the radial direction of polarizing film 14 in a structure that protrudes to the convex surface 16 side) can be further molded into curved portion 60. The polarizing film tends to be deformed in a direction perpendicular to polarization axis 70 by the heat treatment. Providing ribs 85 can further inhibit the deformation of polarizing film 14 due to the heat treatment, and reduce astigmatismus defects.

MODIFICATION EXAMPLE 3

In the above implementation mode, a lens mold 12 was used to manufacture polarizing plastic lens 100. However, the method of employing a gasket having a member that supports polarizing film 14 and other known methods of manufacturing a polarizing plastic lens 100 using a polarizing film 14 that has been curved surface processed can also be applied. Since the reversed polarizing film 14 tends not to curl, it can also be used in these methods to stabilize the quality of the external appearance of polarizing plastic lens 100 and enhance manufacturing efficiency.

A further aspect of the present invention relates to a device of manufacturing a polarizing film.

The above manufacturing device includes a film reversing member set that is used in the reversing step to reverse the convex surface shape to a concave surface shape by pressing the polarizing film that has been curved surface processed;

the film reversing member set includes a pressing member with a convex surface and a polarizing film positioning member having an outer circumference portion and a concave portion in a center portion surrounded by the outer circumference portion.

In an embodiment, the curvature of the pressing member convex surface and the curvature in the radial direction of the surface portion of the outer circumference portion are identical. Further, in the reversing step of a polarizing film having a curvature identical to these, the film reversing member set is desirably employed.

The reversal member sets of a polarizing film positioning member and pressing member of identical curvature can be prepared as multiple sets of varying curvatures. Among the multiple sets, a reversal member set having a curvature corresponding to the curvature of the polarizing film being subjected to the reversing step can be selected and the reversing step can be conducted. This makes it possible to implement steps of reversing polarizing films of various shapes (curvatures) without having to manufacture new members each time. FIG. 24 is a perspective view of two sets of reversal member sets with different curvatures. The pressing member (referred to as a low base curve curving member) that is shown in FIG. 24(A) is of lower curvature than the pressing member shown in FIG. 24(C) (referred to as a high base curve pressing member). The film positioning member shown in FIG. 24(B) (referred to as a low base curve film positioning member) has a curvature in the radial direction of the surface portion of the outer circumference portion of the film positioning member that is smaller than that of the film positioning member (referred to as a high base curve film positioning member) that is shown in FIG. 24(D). Further, the low base curve pressing member and the low base curve film positioning member have the same curvature, and the high base curve pressing member and the high base curve film positioning member have the same curvature. In this case, the low base curve pressing member and the low base curve film positioning member constitute a single set of reversing member (for low base curve), and the high base curve pressing member and the high base curve film positioning member constitute a single set of reversing member (for high base curve). Based on the curvature of the polarizing film being subjected to the reversing step, one or the other of the reversal member sets is used to conduct the step of reversing the polarizing film. Here, it is desirable to select the reversal member set of the curvature that is closest to the polarizing film. The closer the curvature of the reversal member set employed in the reversing step is to the curvature of the polarizing film, the closer the curvature of the polarizing film following the reversing step will be to the shape imparted by the curved shape processing, which is desirable.

An embodiment in which two reversal member sets are employed has been described above. However, more numerous reversal member sets of different curvatures can be prepared to make it possible to select a reversal member set that is closer to the curvature of the polarizing film being subjected to the reversing step.

Study on the type of adhesive and methods of forming adhesive columns

The four adhesives shown in Table 1 below were used to form adhesive columns on the rim portions of the molding surface of a downward facing upper mold in the above implementation mode. After forming adhesive columns, the bonding step and adhesive column curing step were implemented based on the above implementation mode to bond the upper mold to the polarizing film (Tests 1 to 4). Tests 1 to 4 were conducted under identical conditions with the exception that the adhesives were varied.

As Test 5, lens monomer was discharged downward onto the molding surface of an upper mold with its molding surface facing upward through a discharge nozzle that was positioned above the molding surface to form adhesive columns based on the implementation mode described in above-cited Japanese Unexamined Patent Publication (KOKAI) No. 2012-198389 using adhesive A. Subsequently, the upper mold and the polarizing film were bonded based on the implementation mode described in the same publication.

In these tests, adhesive columns 1.0 to 2.0 mm in diameter were formed in 32 spots as shown in FIG. 18.

In each of the tests, the height of the adhesive columns positioned between the upper mold and the polarizing film was measured. Evaluation was conducted by determining how close the average value of the height measured in 32 spots was to the targeted height of the adhesive columns (setting value) according to the following evaluation scale. The results are given in Table 1.

<Evaluation Scale>
A: Setting value down to −10% (range permitting extremely precise control of the setting height)
B: Setting value −11% to −20% (range permitting precise control of the setting height)
C: Setting value −21% to −30%
D: Setting value −31% and below
E: Tilting and toppling of adhesive columns occurred

TABLE 1

|  | Test 1 | Test 2 | Test 3 | Test 4 | Test 5 (Adhesive applied downward from above) |
|---|---|---|---|---|---|
| Type of adhesive | Adhesive A | Adhesive B | Adhesive C | Adhesive D | Adhesive A |
| Thixotropy coefficient | 3 to 4 | 3 to 4 | 2.0 | 1 to 1.5 | 3 to 4 |
| Viscosity mPa · s | 52,000 | 35,000 | 30,000 | 60,000 | 52,000 |
| Evaluation results (control of height of adhesive column) | A | A | C | D | E |

Adhesive A: Ultraviolet-curable acrylic resin composition World Rock 8840H2 made by Kyoritsu Chemical & Co., Ltd.
Adhesive B: Ultraviolet-curable acrylic resin composition World Rock 8172H2 made by Kyoritsu Chemical & Co., Ltd.
Adhesive C: Ultraviolet-curable acrylic resin composition World Rock XVL90T3 made by Kyoritsu Chemical & Co., Ltd.
Adhesive D: Ultraviolet-curable acrylic resin composition World Rock XB06 made by Kyoritsu Chemical & Co., Ltd.

Study on heating temperature of polarizing film after curved surface processing

<Fabrication of Sample Lens 1>

1. Wetting Treatment of Polarizing Film, Curved Surface Processing, and Subsequent Heat Treatment A commercial dichroic dye polymerizing film made of PVA was placed in a constant humidity high temperature device and subjected to a wetting treatment. It was wetted to a moisture content of about 4% at the start of the curved surface processing. The wetted polarizing film was placed for about 2 minutes at room temperature (20 to 25° C.) and then curved surface processed by the method set forth above based on FIG. 7. The curved surface processing was also conducted at room temperature.

Next, the curved surface processed polymerizing film was heated for 30 minutes at 120° C. in a commercial hot air recirculating oven. The heating was conducted without a curved surface processing base (glass mold) 260.

2. Molding and Mold Release of Lens by Casting Polymerization Method

A 50.6 g quantity of m-xylene diisocyanate and 49.4 g of 4,8-dimercaptomethyl-1,11-dimercapto-3,6,9-trithiaundecane were admixed as plastic lens starting materials and thoroughly stirred.

To this were added 1.2 g of a UV absorbing agent sold as "SEESORB701" (made by Cipro Chemical Industries) and 0.1 g of an internal mold release agent sold as "MR internal mold release agent" (made by Mitsui Chemical Corp.). Mixing was followed by thorough stirring. To the fully dispersed or dissolved plastic lens starting materials was added a catalyst in the form of 100 ppm of dibutyltin dichloride. The mixture was thoroughly stirred at room temperature to obtain a uniform liquid. This composition was subjected to reduced pressure of 5 mmHg and degassed while being stirred for 30 minutes to fabricate a lens monomer.

The lens monomer that had been prepared was cast into a casting mold having positioned in the interior thereof the polarizing film after the heating treatment of 1. above. The upper mold and lower mold had surfaces that were spherical in shape, inner diameters of 80 mm, and radii of curvature of 130.4 mm.

Subsequently, the casting mold was placed in a heating furnace and a temperature of 30° C. was maintained for 7 hours. Subsequently, the temperature was raised from 30 to 120° C. over 10 hours and heat curing was conducted.

Following the heat curing, the casting mold was removed from the heating furnace and the lens was removed from the casting mold to obtain a lens (semifinished lens). The concave surface of this lens was ground/polished with a curve generator and polishing apparatus to obtain an eyeglass lens for vision correction in accordance with a prescription.

<Evaluation of Optical Performance of Lens>

After mold release, to evaluate deformation of the lens (in a round uncut state), the optical performance was evaluated based on the following items. Visual examination was implemented by inspectors with three years or more of experience in lens inspection operations. The evaluation results are given in Table 2.

(1) Shape Deformation

The maximum radius of curvature (mm) (Rmax) at the position of the geometric center of the convex surface of the lens (=optical center) and the minimum radius of curvature (mm) (Rmin) were measures with a "FOCOVISON" radius of curvature measuring device (made by Automation & Robotics).

The difference in curvature (Rmax−Rmin) of the maximum radius of curvature (mm) and minimum radius of curvature (mm) was adopted as an indicator of deformation (astigmatism) of the lens and evaluated as set forth below. The convex surface of the lens was of spherical design. The geometric center of the convex surface is the point of intersection of a perpendicular line passing through the center of the circle when the lens is viewed from above and the side of the convex surface of the lens.

A difference in curvature of 0 or more but less than 3 mm was evaluated as: ○ (passing); 3 mm or more but less than 4 mm as: Δ (some deformation seen but no impediment for use in eyeglasses); 4 mm or more: X (practical impediments).

(2) Discoloration of Polarizing Film

The presence or absence of discoloration of the polarizing film in the lens was visually determined.

No discoloration: ○

Coloration of a degree presenting no change in hue observed: Δ

Discoloration presenting a clearly different hue: X (3) Distortion of Polarizing Film Distortion (deformation of surface shape) of the polarizing film within the lens was visually (by inspectors with three or more years of experience in lens inspection operations) determined.

No distortion observed at all: ○

Distortion observed in some of the rim portions of the lens, but no practical problems presented for eyeglasses: Δ

Readily apparent distortion: X

Overall Evaluation

A lens that received no X for lens deformation, discoloration of polarizing film, or distortion of polarizing film was evaluated as ○, and a lens that received at least one X was evaluated as X. Lenses that received ○ in all evaluated items were evaluated as ⊚.

<Sample Lenses 2 to 5 and Reference Lenses 1 to 4>

With the exception that heating of the polarizing films that had been curved surface processed was conducted under the conditions given in Table 2, various sample lenses and reference lenses were fabricated in the same manner as Sample Lens 1. Reference Lens 1 was employed without heating the polarizing film.

<Sample Lenses 6 and 7, Reference Lenses 5 and 6>

With the exceptions that a commercial laminated polarizing film (TAC/PVA) having TAC protective layers on both surfaces of a dichroic dye polarizing film made of PVA was employed instead of using commercial dichroic dye polarizing film made of PVA in the fabrication of Sample Lens 1 and heating of the polarizing film was conducted under the conditions given in Table 2, various sample lenses and reference lenses were fabricated in the same manner as Sample Lens 1.

<Sample Lens 8>

With the exception that the polarizing film was held by the curved surface processing base 60 used in the curved surface processing to conduct heating, a lens was fabricated in the same manner as in the fabrication of Sample Lens 2.

TABLE 2

| | Polarizing film | Glass mold | Condition of heating polarizing film | | Rmax (nm) | Rmin (nm) | Rmax − Rmin (nm) | Lens deformation | Discoloration of polarizing film | Distortion of polarizing film | Overall evaluation |
| | | | Heating temperature (° C.) | Heating time (hour) | | | | | | | |
|---|---|---|---|---|---|---|---|---|---|---|---|
| Sample Lens 1 | PVA | None | 120 | 0.5 | 129 | 127.9 | 1.1 | ○ | ○ | Δ | ○ |
| Sample Lens 2 | PVA | None | 120 | 2 | 129 | 126.3 | 2.7 | ○ | ○ | Δ | ○ |
| Sample Lens 3 | PVA | None | 130 | 2 | 129.7 | 126.9 | 2.8 | ○ | ○ | Δ | ○ |
| Sample Lens 4 | PVA | None | 105 | 2 | 130.1 | 126.6 | 3.5 | Δ | ○ | Δ | ○ |
| Sample Lens 5 | TAC/PVA | None | 140 | 2 | 128.9 | 128.1 | 0.8 | ○ | Δ | Δ | ○ |
| Sample Lens 6 | TAC/PVA | None | 120 | 2 | 129 | 127.8 | 1.2 | ○ | ○ | Δ | ○ |
| Sample Lens 7 | PVA | None | 140 | 2 | 129.2 | 128 | 1.2 | ○ | Δ | Δ | ○ |
| Sample Lens 8 | PVA | Employed | 120 | 2 | 129 | 127.7 | 1.3 | ○ | ○ | ○ | ◎ |
| Referene Lens 1 | PVA | None | — | — | 135.7 | 127.9 | 7.8 | X | ○ | Δ | X |
| Referene Lens 2 | PVA | None | 60 | 5 | 136.1 | 128.1 | 8 | X | ○ | Δ | X |
| Referene Lens 3 | PVA | None | 100 | 5 | 132.4 | 127.8 | 4.6 | X | ○ | Δ | X |
| Referene Lens 4 | PVA | None | 150 | 2 | 129.5 | 128 | 1.5 | ○ | X | Δ | X |
| Referene Lens 5 | TAC/PVA | None | 100 | 2 | 136.5 | 126.5 | 10 | X | ○ | Δ | X |
| Referene Lens 6 | TAC/PVA | None | 150 | 2 | 129.5 | 128 | 1.5 | ○ | X | Δ | X |

As shown in Table 2, Sample Lens 4, which was obtained by heating a curved surface processed polarizing film to 105° C., had a difference in radius of curvature (Rmax−Rmin) of 3.5 mm. Sample Lenses 5 and 7, which were obtained by heating the polarizing film to 140° C., exhibited discoloration of a degree that did not present a change in hue. However, both of these sample lenses could be practically used without impediment as polarizing lenses.

Heating to 120 to 130° C. was found to yield less lens deformation and polarizing film discoloration, and to yield a lens with good optical performance and good external appearance.

Both Sample Lenses 6 and 7, in which were employed laminated polarizing films, produced similar results. Thus, the use of a polarizing film that had been heated under similar conditions was found to inhibit shape deformation of the lens, not just in PVA films, but also in other films.

By contrast, in Reference Lenses 1 to 3 and Reference Lens 5, the difference in radius of curvature (Rmax−Rmin) was 4 mm or greater. The lenses presented considerable shape deformation. Reference Lenses 1 to 3 and Reference Lens 5 were all obtained using heating temperatures of less than 105° C. and were thought to not have undergone adequate shrinkage of the polarizing film prior to casting of the composition capable of polymerization for lens substrates. Thus, the polarizing film was thought to have shrunken during thermosetting, deforming the lens.

Deformation of the lens was inhibited due to heating of the polarizing film to 150° C. in Reference Lenses 4 and 6, but the polarizing film underwent degeneration and discoloration.

Sample Lenses 1 to 7, for which curved surface processing base 260 was not employed, exhibited distortion in the shape of the polarizing film, although slight, but Sample Lens 8, for which curved surface processing base 260 was employed, exhibited suppression of distortion in the form of a lens presenting good optical performance.

Accordingly, holding the polarizing film on curved surface processing base 260 to conduct heating was found to suitably inhibit shape deformation and distortion of the polarizing film and yield a lens of better external appearance.

Based on the above results, heating a lens that has been curved surface processed to a prescribed temperature was determined to provide a polarizing plastic lens with little deformation of lens surface shape that causes astigmatism.

In addition, heating a curved surface processed polarizing film while holding it on the curved surface processing base 260 used in curved surface processing can inhibit change in the curved surface portion 261a (see FIG. 7) from the designed shape of the polarizing film. Accordingly, it was possible to manufacture a polarizing lens of better external appearance.

By combining the above-described curved surface processing and method of manufacturing a polarizing lens comprising the step of reversing the polarizing film set forth above, it is possible to provide with high manufacturing efficiency a polarizing lens of extremely high quality and inhibited deformation of the lens surface shape while inhibiting deformation of the film of polarizing film and avoiding handling difficulty due to shrinkage of the curved surface processed film.

INDUSTRIAL APPLICABILITY

The present invention is useful in the field of manufacturing eyeglasses and eyeglass lenses.

The invention claimed is:
1. A method of manufacturing a polarizing plastic lens, which comprises:
  subjecting a polarizing film to curved surface processing to impart a convex surface shape to a first side of the polarization film and a concave surface shape to the side of the polarization film that is opposite to the first side of the polarization film;
  a reversing step of reversing the convex surface shape into a concave surface shape by pressing the polarizing film that has been curved surface processed;

a casting mold assembling step of assembling a casting mold having a cavity within which the reversed polarizing film is positioned with the reversed polarizing film, an upper mold, a lower mold, and a sealing member that maintains a spacing between the upper mold and the lower mold; and forming a polarizing plastic lens comprising the polarizing film positioned within a plastic lens substrate, the polarizing plastic lens being prepared via a single molding operation that includes polymerizing and curing a curable composition that has been cast into the cavity to provide the plastic lens substrate within which the polarizing film is positioned, wherein the plastic lens substrate of the polarizing plastic lens is not formed prior to the polymerization and curing of the curable composition that has been cast into the cavity.

2. The method of manufacturing a polarizing plastic lens according to claim 1, wherein the reversing step is conducted by at least one of convex surface center portion press processing in which a region containing a center portion of the convex surface of the polarizing film that has been curved surface processed is pressed and rear surface rim portion press processing in which a rim portion of a rear surface of the convex surface is pressed.

3. The method of manufacturing a polarizing plastic lens according to claim 2, wherein
the convex surface center portion press processing is conducted by pressing the region with a convex surface of a pressing member, and
the convex surface of the pressing member has an identical curvature to the polarizing film before pressing.

4. The method of manufacturing a polarizing plastic lens according to claim 3, wherein the pressing member has a suctioning means, and the suctioning means suctions and holds the polarizing film that is being pressed.

5. The method of manufacturing a polarizing plastic lens according to claim 2, wherein the rear surface rim portion press processing is conducted by blowing a gas onto the rim portion of the rear surface.

6. The method of manufacturing a polarizing plastic lens according to claim 5, wherein the reversing step is conducted on a polarizing film that has been positioned on a polarizing film holding member;
the polarizing film holding member has an outer circumference portion and a concave portion in a center portion surrounded by the outer circumference portion; and
the rear surface rim portion of the polarizing film comes into contact with the outer circumference portion, and the center portion that is surrounded by the rear surface rim portion is positioned on the concave portion and is held in a state of noncontact with the film holding member.

7. The method of manufacturing a polarizing plastic lens according to claim 6, wherein the film holding member has a curvature in a radial direction of the surface of the outer circumference portion that is identical to a curvature of the polarizing film.

8. The method of manufacturing a polarizing plastic lens according to claim 6, wherein the gas is blown by jetting the gas through ventilation holes provided in the surface of the outer circumference portion.

9. The method of manufacturing a polarizing plastic lens according to claim 8, wherein, prior to jetting the gas, suction is conducted through the ventilation holes to suction and hold the rear surface outer circumference portion of the polarizing film.

10. A polarizing plastic lens provided by the manufacturing method according to claim 1.

11. The method of manufacturing a polarizing plastic lens according to claim 1, wherein the reversing step comprises a cutting step.

12. The method of manufacturing a polarizing plastic lens according to claim 11, wherein in the cutting step a bend portion of an outer circumference of the polarizing film is cut.

13. The method of manufacturing a polarizing plastic lens according to claim 6, wherein the reversing step comprises a cutting step in which a bend portion of an outer circumference of the polarizing film is cut to separate the polarization film from the bend portion.

14. The method of manufacturing a polarizing plastic lens according to claim 13, wherein holes are provided at least on an inside of the outer circumference portion of the film holding member in order to hold via vacuum suction the polarizing film that has been separated from the bend portion.

15. The method of manufacturing a polarizing plastic lens according to claim 13, wherein the bend portion is removed immediately after cutting.

16. The method of manufacturing a polarizing plastic lens according to claim 15, wherein no holes are provided on the film holding member for holding the bend portion in place upon being separated from the polarizing film.

17. The method of manufacturing a polarizing plastic lens according to claim 13, wherein a $CO_2$ laser is used to cut the polarizing film.

* * * * *